United States Patent
Omaru et al.

(10) Patent No.: US 7,220,518 B2
(45) Date of Patent: May 22, 2007

(54) SECONDARY BATTERY AND ELECTROLYTE USED THEREFOR

(75) Inventors: Atsuo Omaru, Fukushima (JP); Takao Nirasawa, Fukushima (JP)

(73) Assignee: Sony Corporation, Tokyo (JP)

( * ) Notice: Subject to any disclaimer, the term of this patent is extended or adjusted under 35 U.S.C. 154(b) by 202 days.

(21) Appl. No.: 10/314,807

(22) Filed: Dec. 9, 2002

(65) Prior Publication Data

US 2003/0190523 A1  Oct. 9, 2003

(30) Foreign Application Priority Data

Dec. 10, 2001 (JP) ............................ P2001-376411
Jun. 13, 2002 (JP) ............................ P2002-173345

(51) Int. Cl.

| | |
|---|---|
| *H01M 10/00* | (2006.01) |
| *H01M 2/16* | (2006.01) |
| *H01M 4/58* | (2006.01) |
| *H01M 4/52* | (2006.01) |
| *H01M 4/50* | (2006.01) |

(52) U.S. Cl. ................. 429/314; 429/188; 429/303; 429/231.95; 429/199; 429/316; 429/144

(58) Field of Classification Search ............... 429/314, 429/188, 303, 231.95, 199, 316, 144
See application file for complete search history.

(56) References Cited

U.S. PATENT DOCUMENTS

| 6,696,202 | B2 * | 2/2004 | Arai ...................... 429/231.95 |
| 6,730,439 | B2 * | 5/2004 | Kamei et al. ............... 429/247 |
| 6,815,121 | B2 * | 11/2004 | Dasgupta et al. ........... 429/212 |
| 2002/0146621 | A1 * | 10/2002 | Yageta et al. ............... 429/181 |

* cited by examiner

*Primary Examiner*—Patrick Joseph Ryan
*Assistant Examiner*—Angela J. Martin
(74) *Attorney, Agent, or Firm*—Sonnenschein Nath & Rosenthal LLP

(57) ABSTRACT

A secondary battery which exhibits less deterioration of capacity, can maintain high energy densities in high temperature atmospheres, and has high practicality, and an electrolyte used therefor, are provided. The electrolyte contains an anion expressed by $(PF_aQ_bR_c)^-$, so degradation of the electrolyte can be prevented. In the formula, Q expresses at least one of $CF_3$, $C_2F_5$, and $C_3F_7$, and R expresses $SO_2CF_3$ and/or $SO_2C_2F_5$. a, b and c satisfy $1 \leq a \leq 5$, $0 \leq b \leq 5$, and, $0 \leq c \leq 5$, respectively. Furthermore, an anion expressed by $N(C_nF_{2n+1}SO_2)_2^-$ is contained, which can further prevent the degradation of the electrolyte. In the formula, n satisfies $1 \leq n \leq 2$. Therefore, the capacity recovery rate after storage and heavy load discharge maintenance rate are high even in high temperature atmospheres, and high reliability can be obtained.

14 Claims, 3 Drawing Sheets

SECONDARY BATTERY AND ELECTROLYTE USED THEREFOR

RELATED APPLICATION DATA

The present application claims priority to Japanese Application(s) No(s). P2001-376411 filed Dec. 10, 2001, and P2002-173345 filed Jun. 13, 2002, which application(s) is/are incorporated herein by reference to the extent permitted by law.

BACKGROUND OF THE INVENTION

1. Field of the Invention

The present invention relates to a secondary battery comprising an electrolyte, a positive electrode and a negative electrode, and an electrolyte used therefor.

2. Description of the Related Art

In recent years, many small portable electric equipments, such as video cameras combined with video tape recorder, cellular phones, and laptop computers, appear, and the miniaturization and the weight saving thereof are investigated. Batteries with a high energy density are required as a portable power supply for these electric equipments. This advances the research and development for improving the energy density of the batteries, especially of secondary batteries, actively. Specifically, lithium ion secondary batteries, where a carbon material and $LiCoO_2$ or the like are used respectively as a negative electrode and for a positive electrode, have a high energy density compared with conventional aqueous electrolyte secondary batteries such as a lead battery, a nickel-cadmium battery, and a nickel-hydrogen battery. Therefore, the lithium ion secondary batteries are widely used as an optimal power supply of portable electric equipments such as notebook personal computers (hereinafter referred as notebook computers), cellular phones and personal digital assistances (PDA).

Particularly, notebook computers have a hard disk drive as a motor drive, and a liquid crystal display using luminescence, and the speed of a central processing unit (CPU) thereof is higher, so power consumption thereof becomes much higher. Electric equipments requiring high power such as the notebook computers use plural battery packs which are connected in series and in parallel. Micro porous films which are made of a polyolefin such as polyethylene and polypropylene are generally used as a separator in the batteries using nonaqueous electrolyte such as the lithium ion batteries. Some of these micro porous films exhibit shutdown functions of closing pores of the micro porous film when a battery internal temperature increases unusually.

However, in the above electric equipments, electric power is consumed not only by operations of each device inside the electric equipments, but also by the attendant heat generation, and the heat generation always increases an internal temperature of the electric equipments to high temperatures in the order of 50° C. to 70° C. in use. That is, in a type of the built-in battery equipments, exposing the battery to high temperature atmospheres causes capacity deterioration and charge and discharge in the high temperature atmospheres causes also the capacity deterioration. This reduces discharge capacities thereof in real operating conditions and cannot provide time enough to drive the equipments. Further, heat deteriorates the polyethylene micro porous films which are used as the separator of the lithium batteries and the like.

SUMMARY OF THE INVENTION

The present invention has been achieved in view of the above problems. It is a first object of the invention to provide a secondary battery which is less subject to the capacity deterioration and maintains high energy densities even in high temperature atmospheres, and an electrolyte used therefor.

It is a second object of the invention to provide a secondary battery which has excellent capacity storage characteristics at high temperatures and cycle characteristic in high temperature atmospheres and high practicability, and an electrolyte used therefor.

A secondary battery according to the invention comprises a positive electrode, a negative electrode and an electrolyte, wherein the electrolyte contains an anion expressed by Chemical formula 1: $(PF_aQ_bR_c)^-$ (wherein, Q expresses at least one selected from the group consisting of $CF_3$, $C_2F_5$, and $C_3F_7$, and R expresses $SO_2CF_3$ and/or $SO_2C_2F_5$, and a, b and c satisfy $1 \leq a \leq 5$, $0 \leq b \leq 5$, and $0 \leq c \leq 5$, respectively).

According to the secondary battery of the invention, the electrolyte contains the anion expressed by the above Chemical formula 1, which can prevent degradation of the electrolyte, even when the battery is exposed to high temperature atmospheres and when a charge and discharge cycle is repeated.

An electrolyte according to the invention comprises an anion expressed by the following Chemical formula 2: $(PF_aQ_bR_c)^-$ (wherein Q expresses at least one selected from the group consisting of $CF_3$, $C_2F_5$, and $C_3F_7$, R expresses $SO_2CF_3$ and/or $SO_2C_2F_5$, and a, b and c satisfy $1 \leq a \leq 5$, $0 \leq b \leq 5$, and $0 \leq c \leq 5$, respectively).

According to the electrolyte of the invention, the electrolyte contains the anion expressed by the above Chemical formula 2, which can prevent degradation of the electrolyte itself, even when the electrolyte is exposed to high temperatures.

Other and further objects, features and advantages of the invention will appear more fully from the following description.

DETAILED DESCRIPTION OF THE PREFERRED EMBODIMENTS

Embodiments of the present invention will be described in detail below with reference to accompanying drawings.

<Structure of a Secondary Battery>

First, with reference to FIG. 1, a structure of a secondary battery according to a first embodiment of the invention will be described.

Figure 1:
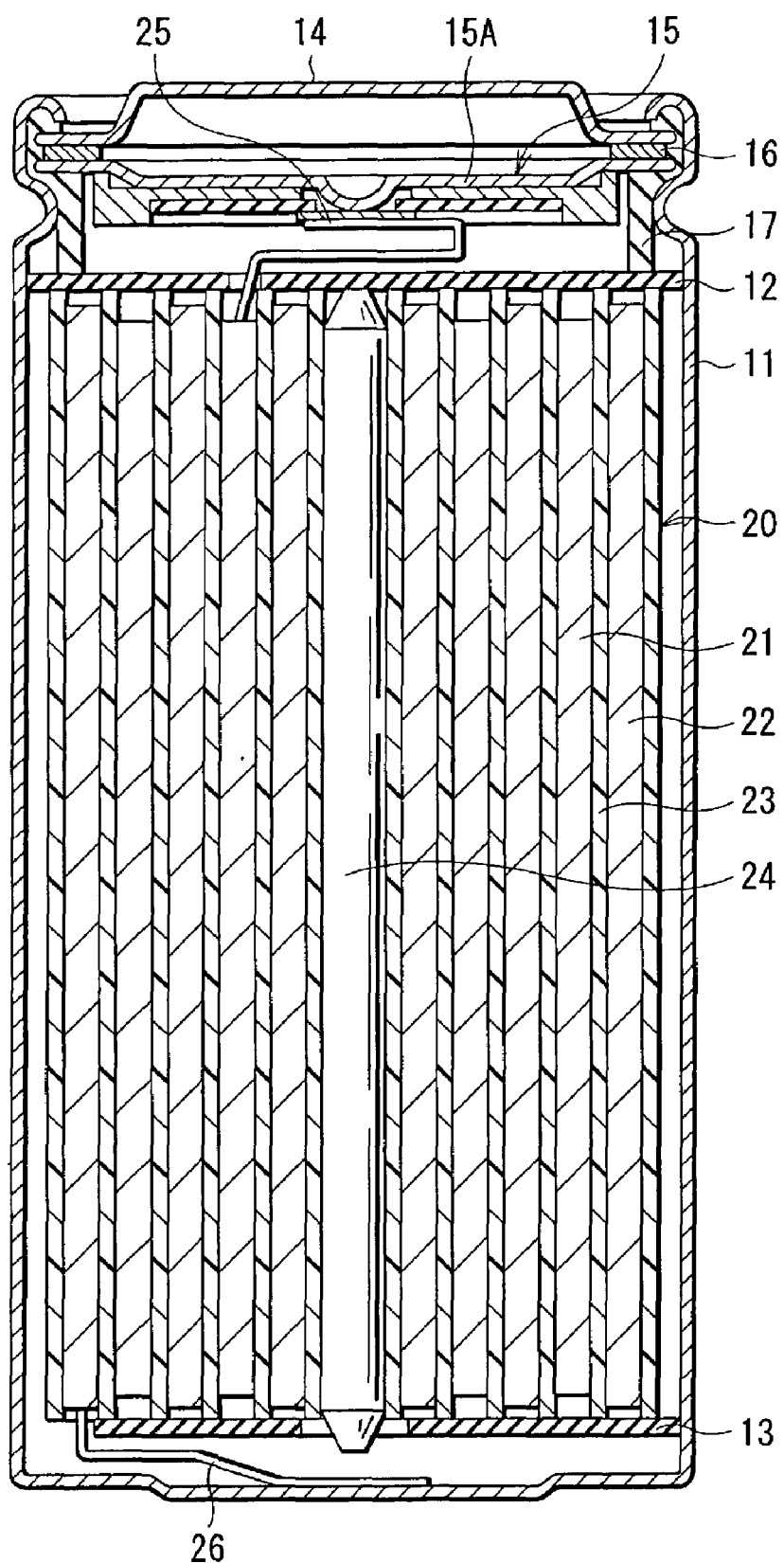
FIG. 1 is a sectional view showing a structure of a secondary battery according to an embodiment of the invention.

FIG. 1 shows a sectional structure of the secondary battery which is a so-called cylinder type. The battery has a spiral electrode body 20, in which a band-like positive electrode 21 and a band-like negative electrode 22 are wound with a separator 23 therebetween, inside a hollow cylinder-like battery can 11. The battery can 11 is made of nickel (Ni) plated iron, one end thereof is closed, and the other end is opened. Inside the battery can 11, a pair of insulating plates 12 and 13 are arranged to sandwich the spiral electrode body 20 perpendicularly to a periphery surface thereof.

A battery lid 14, and a safety valve mechanism 15 and a positive temperature coefficient (PTC) element 16 which are positioned inside the battery lid 14, are mounted in the open end of the battery can 11 by caulking via a gasket 17 to seal the inside of the battery can 11. The battery lid 14 is made of the same material as the battery can 11. The safety valve mechanism 15 is electrically connected to the battery lid 14 through the PTC element 16. When an internal pressure of the battery becomes more than certain value due to internal short circuit or heating from outside, a disk plate 15A is inverted to cut the electric connection between the battery lid 14 and the spiral electrode body 20. The PTC element 16 restricts electric currents, when its resistance increases with an increase in temperature, to prevent unusual heat generation due to high electric currents, and is made of barium titanate semiconductor ceramic, for example. The gasket 17 is made of an insulating material and to a surface thereof is applied asphalt.

The spiral electrode body 20 is wound centering on a center pin 24. A positive electrode lead 25 containing aluminum (Al) or the like is connected to the positive electrode 21 of the spiral electrode body 20, and a negative electrode lead 26 containing nickel or the like is connected to the negative electrode 22. The positive electrode lead 25 is welded to the safety valve mechanism 15 to be electrically connected with the battery lid 14.

Figure 2:
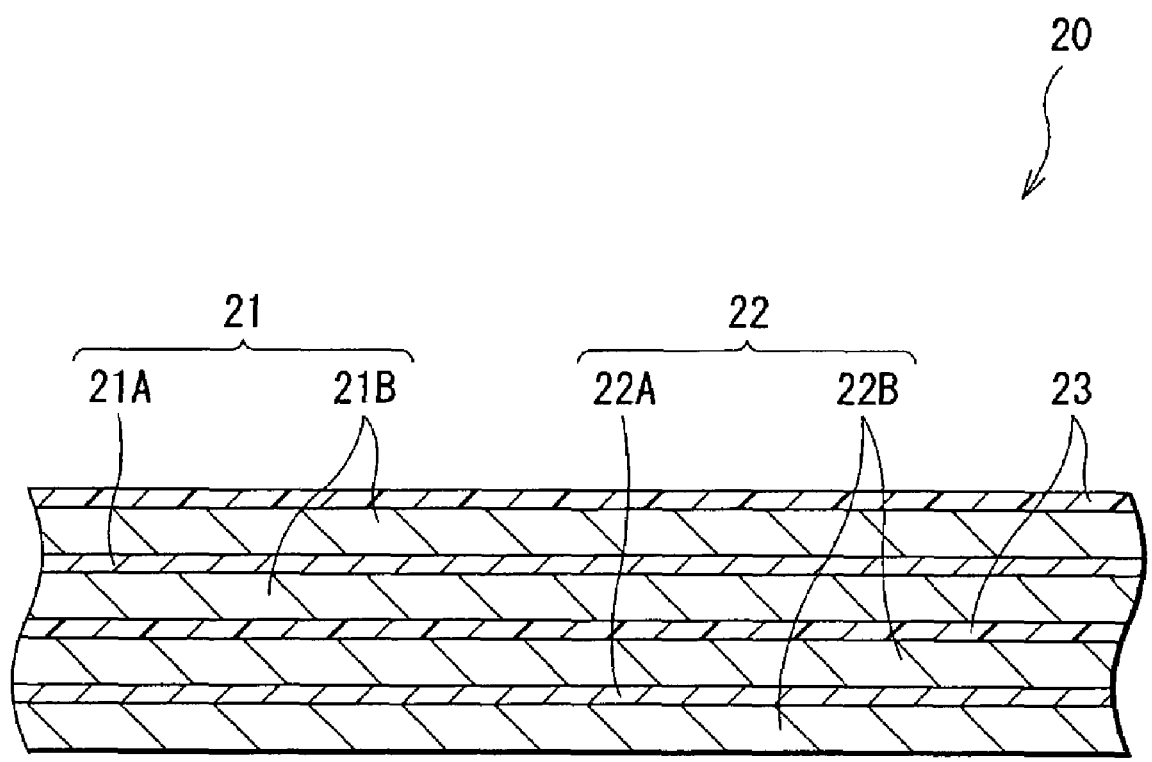
FIG. 2 is a partially enlarged sectional view of a spiral electrode body shown in FIG. 1.

FIG. 2 is a partially enlarged view of the spiral electrode body 20 shown in FIG. 1. The positive electrode 21 has a structure, for example, where a positive electrode collector 21A has a pair of opposed surfaces and on both sides thereof are located positive active material layers 21B. In addition, the positive active material layer 21B may be located only on one side of the positive electrode collector 21A, which is not shown. The positive electrode collector 21A has a thickness of about 5 μm-50 μm, and is made of a metallic foil such as aluminum foil, nickel foil, or stainless-steel foil. The thickness of the positive active material layer 21B is 20 μm, and the positive active material layer 21B is composed to contain a positive active material, and if needed, a conductive agent such as carbon black or graphite and a binding agent such as polyvinylidene fluoride, for example. In addition, the thickness of the positive active material layers 21B, which are located in both sides of the positive electrode collector 21A, is a total thickness thereof.

The positive active material can preferably include metal oxides, metal sulfides, metal nitrides, silicon compounds, lithium containing compounds, and certain polymeric materials, for example, and one or more kinds are selected therefrom for a purpose of using the battery.

Particularly, lithium composite metal oxides which have a basic structure of $Li_sM_tO_u$ and contain sufficient lithium are preferable for the metal oxides, because using these lithium composite metal oxides can increase voltages and provide high energy densities. Here, M in the above composition formula, is preferably one or more kinds selected from transition metal, especially from the group consisting of cobalt (Co), nickel (Ni), manganese (Mn), iron (Fe), aluminum (Al), vanadium (V), titanium (Ti), and magnesium (Mg). In this case, values of s, t, and u, are preferably $s \geq 1$, $t \geq 1$, and $u \geq 2$, respectively. Examples of theses lithium composite metal oxides can include $LiCoO_2$, $LiNiO_2$, and $LiMn_2O_4$ which has a spinel type structure.

In addition, the quantity of lithium (atoms or ions) corresponding to a charge and discharge capacity of 300 mAhs or more per 1 g of a negative active material (for example, a carbon material), which composes a negative active material layer 22B and is described later, in a steady state (for example, a state after repeating charge and discharges about five times), should be contained at least in the positive electrode 21 or the negative electrode 22. It is more preferably that lithium corresponding to a charge and discharge capacity of 320 mAhs or more per 1 g of the negative active material is contained, particularly. Thus, composite metal oxides expressed by $M_qO_r$ (wherein M represents at least one kind of transition metals such as cobalt, nickel, manganese, iron, aluminum, vanadium, titanium, and magnesium, and q and r depend on a charge and discharge state of the battery and are usually $1 \leq q \leq 3$ and $1 \leq r \leq 8$) are also applicable for the positive active material, when sufficient lithium is contained in the negative active material.

The negative electrode 22 has a structure, for example, where a negative electrode collector 22A has a pair of opposed surfaces and on both sides thereof are located negative active material layers 22B, as well as the positive electrode 21. In addition, the negative active material layer 22B may be located only on one side of the negative electrode collector 22A, which is not shown.

The negative electrode collector 22A is made of single metal foil such as copper (Cu) foil or nickel (Ni) foil, or copper alloy foil, or alloy foil such as nickel-alloy foil, or stainless-steel foil, for example. These metal foils and alloy foils are preferable, because they provide high electronic conductivity and good influences on heavy load characteristics, and are cheap and easily available.

The negative active material layer 22B is composed to contain a negative active material and, if needed, a binding agent such as polyvinylidene fluoride. The negative active materials can include alkali metals such as lithium (Li), sodium (Na) and potassium (K), and alkali earth metals such as calcium (Ca), strontium (Sr), and barium (Ba). In addition, elementary substances, alloys, and compounds of metallic elements and metalloid elements which can form an alloy with lithium can be included. Containing at least one kind of these negative active materials is preferable because these materials provide higher capacities. The alloys can include not only the alloys made of two or more kinds of the metallic elements, but also alloys made of one or more kinds of metallic elements with one or more kinds of metalloid elements. Some of them have a structure of a solid solution, a eutectic (a eutectic compound), an intermetallic compound, or coexistence of two or more thereof.

The metallic elements and the metalloid elements which can form an alloy with lithium can include silver (Ag) aluminum (Al), arsenic (As), boron (B), bismuth (Bi), cadmium (Cd), gallium (Ga), germanium (Ge), hafnium (Hf), lead (Pb), tin (Sn), silicon (Si), yttrium (Y), zinc (Zn), and the like, for example.

These alloys and compounds can include substances expressed by chemical formulas of $M\alpha_e M\beta_f Li_g$ and $M\alpha_h M\gamma_i M\delta_j$, for example. In these chemical formulas, Mα expresses at least one kind selected from a first group consisting of the metallic elements and the metalloid elements which can form an alloy with lithium, Mβ expresses at least one kind selected from a second group consisting of metallic elements and metalloid elements except for the first group and lithium, Mγ expresses at least one kind selected from nonmetallic elements, and Mδ expresses at least one kind selected from the lithium and the second group. Here, values of e, f, g, h, i, and j are $e > 0$, $f \geq 0$, $g \geq 0$, $h > 0$, $i > 0$, and $j \geq 0$, respectively. Particularly, the alloys and compounds containing one or more kinds in the second group are preferable, because the existence of the metallic elements or metalloid elements which form no alloy with lithium relieves volume change of alloy particles, and improves more reliability of charge and discharge cycle characteristic. On the other hand, when only the metallic elements and the metalloid elements which can form an alloy with lithium are contained, the volume of the alloy particles is changed significantly during charge and discharge, so contact among the particles is progressively deteriorated, as the charge and discharge cycle is repeated, and this reduces electronic conductivity.

Furthermore, the negative active material layer 22B can include other negative active material in addition to the elementary substances, the alloys, and the compounds of the metallic elements and the metalloid elements which can form an alloy with lithium. Other negative active materials can include carbon materials which can insert and extract lithium, metal oxides, and polymeric materials.

The carbon materials used as the negative active material can include graphite, nongraphitizing carbon, graphitizing carbon, carbon black, fiber-type carbon, pyrolytic carbon, and the like. The nongraphitizing carbon preferably has physical property parameters of a (002) spacing of 0.37 nm or more, and a true density less than 1.70 g/cm$^3$, and no exothermic peak in a range of 700° C. or more in differential thermal analysis (DTA) in the air. Such nongraphitizing carbon may be obtained by firing furan resin which consists of homopolymer of wfurfuryl alcohol or furfural, copolymer thereof, or a copolymer of either with other resin, and carbonizing it. Conjugated resins such as phenol resins, acrylate resins, halogenated vinyl resins, polyimide resins, polyamidoimide resins, polyamide resins, polyacethylene, and poly (p-phenylene), cellulose, derivatives of cellulose, and other organic macromolecular compounds can also be used as an organic material which is a starting material. The above starting materials should be treated with heat at about 1200° C., ground and classified to obtain the nongraphitizing carbon. The heat treatment is to carbonize the material at 300° C.-700° C., to increase a temperature at a temperature increase rate of about 1° C.-100° C. per minute to a final temperature of about 900° C.-1300° C., and to fire it maintaining the final temperature for about 0 to 30 hours. In this case, the carbonization step may be eliminated. Moreover, the grinding step may be performed before or after the carbonization, or during the increasing temperature step.

The nongraphitizing carbon may also be obtained by introducing a functional group containing oxygen into petroleum pitch having hydrogen atoms (H) and carbon atoms (C) with a specific atomic ratio (H/C atomic ratio) (which is the so-called oxygen bridging), like the above utilization of the furan resin. In this case, although a temperature becomes as high as 400° C. or more in a carbonization step, the bridging finally becomes the nongraphitizing carbon in a solid-phase state without being fused. Here, the H/C atomic ratio in the petroleum pitch is important, and is preferably 0.6-0.8. In addition, the petroleum pitch is obtained by performing operations, such as distillation (vacuum distillation, atmospheric distillation, or steam distillation), thermally polycondensation, extraction, chemical polycondensation, and the like, on tars, which are obtained by pyrolyzing coal tar, ethylene bottom oil, crude oil and the like at high temperatures, asphalt and the like.

Concrete applicable procedures for the oxygen bridging of the petroleum pitch can include but not particularly limited to wet processes using an aqueous solution such as nitric acid, a mixed acid, sulfuric acid, or hypochlorous acid, dry processes using an oxidizing gas (such as the air or oxygen), and reactions using a solid reagent such as sulfur, ammonium nitrate, ammonium persulfate, or ferric chloride, for example. In this case, an oxygen content ratio thereof influences a crystal structure of the finally manufactured carbon. The oxygen content ratio is preferably 3% or more, and more preferably 5% or more, as shown by the present applicant in Japanese Patent Laid Open No. 3-252053, but not particularly limited to these. These ranges of the oxygen content rate provide nongraphitizing carbon having a (002) spacing of 0.37 nm or more, no exothermic peak in the DTA at a temperature of 700° C. or more in the air current, and high negative electrode capacities.

As well as the above organic materials which are the starting materials, a compound containing phosphorus (P), oxygen and carbon as a principal component, which are described in Japanese Patent Laid Open 3-137010, is applicable for manufacturing the nongraphitizing carbon, since the compound has also the above parameters.

Furthermore, the organic materials used as the starting material are not limited to the above, other organic materials may be used, and the procedures for the oxygen bridging treatment are not limited to the above, as long as the oxygen bridging treatment and the like produces the nongraphitizing carbon through a solid phase carbonization process.

The graphite used as the negative electrode material in the embodiment preferably has a true density $\rho$ of 2.10 g/cm$^2$ or more, and more preferably, of 2.18 g/cm$^2$. In order to obtain these true density $\rho$, the thickness of C axis crystal of a (002) surface should be 14.0 nm or more. Furthermore, the spacing between the (002) surfaces, which is obtained with an X-ray diffractometry method or the like, is preferably less than 0.340 nm, and more preferably not less than 0.335 nm nor more than 0.337 nm.

Moreover, using graphite material having a bulk density D, which is obtained by the measuring method of JIS K 1469, of 0.4 g/cm$^3$ or more provides long cycle life, because the negative electrode, which is formed using the graphite with a bulk density D of 0.4 g/cm$^3$ or more, has a good electrode structure, and separation of the graphite material from the negative active material layer 22B and the like are difficult to occur. The bulk density D of the graphite is preferably 0.5 g/cm$^3$ or more in particular, and more preferably 0.6 g/cm$^3$ or more.

A method of obtaining a bulk density D of the graphite with JIS K 1469 will be described. 100 cm$^3$ of graphite powder as a sample is added in a graduated cylinder with the maximum capacity of 100 cm$^3$, of which the weight is previously measured, using a spoon or the like. The whole weight is measured using minimum scale set to 0.1 g. The whole weight less the weight of the graduated cylinder is the mass W of the graphite powder as the sample. Next, a cork stopper is put on the graduated cylinder added the graphite powder, and it is dropped down about 50 times with the cork stopper facing up in the perpendicular direction from a height of about 5 cm toward a rubber board which is positioned horizontally. This allows the graphite powder in the graduated cylinder to be compressed, and the volume V of the compressed sample powder is read. The bulk density D (g/cm$^3$) is calculated with the obtained mass W and volume V as described above and with the following Equation (1).

$$D=W/V \qquad (1)$$

Furthermore, in order to obtain a long cycle life, it is preferably to use powder with a bulk density in the above range and an average $X_{ave}$ of shape parameters X, which are expressed by the following Equation (2), of 125 or less for the graphite material.

$$X=(W/T)\times(L/T) \qquad (2)$$

In Equation (2), T expresses a thickness of the thinnest part of the graphite powder, L expresses a length in the long axis direction of the graphite powder, and W expresses a length in the direction perpendicular to the long axis of the graphite powder. As shown in Equation (2), the shape parameter X is the product of W divided by T and L divided by T. Less X can increase a perpendicular height to an area of base and decrease a degree of flatness.

In order to obtain more excellent long cycle life, the average shape parameter $X_{ave}$ is preferably not less than 2 nor more than 115, and more preferably not less than 2 nor more than 100. Moreover, in order to obtain high safety and reliability as a practical battery, it is preferable that particle size distribution of the graphite powder, which is obtained by the laser diffractometry, satisfies the following conditions. That is, the graphite powder preferably satisfies the conditions of 10% cumulative particle size of 3 μm or more, 50% cumulative particle size of 10 μm or more, and 90% cumulative particle size of 70 μm or less. Of the above conditions, 90% cumulative particle size of 60 μm or less is preferable in particular, because initial defects being described later are reduced drastically. The graphite powder having particle size distribution conforming to normal distribution is more preferable, because it is efficiently molded to provide the electrode. Deviation of the particle size distribution and increase in the number of particles with small particle size cause a tendency of increasing temperature of heat generated in the battery which is subject to unusual situations such as overcharge, so such powder is not preferable. On the contrary, increasing the number of particles with a big particle size increases occurrences of initial defects such as internal short circuit which are generated during a first charging, and this is also not preferable. When the battery is charged, lithium ions are introduced into spaces among the graphite layers, a crystal structure thereof expands by about 10%, and the positive electrode and the separator in the battery are pressed, which causes these initial defects. Thus, in order to secure the battery with high reliability, the particle size distribution is very important.

Generally, high crystallinity graphite has a hexagonal graphite structure. That is, it has a crystal structure where surfaces with a hexagonal net shape are developed in the a-axis direction and the hexagonal net shaped surfaces are piled up in the c-axis direction. Bonds among the hexagonal net shaped surfaces are mainly weak ones called van der Waals forces, so adding external force tends to cause deformation in the c-axis direction. Therefore, if graphite powder particles having such a graphite structure are compressed and molded to provide the electrode, they are more easily broken than carbon materials fired at low temperatures and hardly secure holes. On the other hand, high breaking strength of the graphite particles can easily provide the holes and secure the heavy load characteristics as the practical battery. Mobility of ions during the discharging influences the heavy load characteristics, so existence of the holes in the electrode permits also existence of sufficient quantity of the electrolytic solution and provides excellent characteristics. Particularly, breaking strength of 6.0 N/mm$^2$ or more can secure suitable porosity in the negative electrode and is preferable.

Natural graphite and artificial graphite may be used as the negative electrode material, as long as the graphite has the true density p, the bulk density D, the shape parameter X, the particle size distribution, and the particle breaking strength, which are described above. Coal and pitches can be used as an organic material which is a starting material for the formation of the artificial graphite. The pitches can include tars obtained by pyrolyzing coal tar, ethylene bottom oil, and the crude oil at high temperatures, products obtained by performing distillation (vacuum distillation, atmospheric distillation, or steam distillation), thermally polycondensation, extraction, and chemical polycondensation on asphalt, pyroligneous products, polyvinyl chloride resins, polyvinyl acetate, polyvinyl butyrate, and 3,5-dimethylphenol resins. When the coal and these pitches, which exist as liquid at a maximum temperature of about 400° C. during carbonization, are exposed to the above temperature, aromatic rings thereof are condensed each other to form polycycle products and are oriented to form a laminate, and then a solid carbon precursor, i.e., semicoke, is produced at about 500° C. or more. In addition, such a process is called liquid phase carbonization process, and is a typical formation process of graphtizing carbon.

Condensed polycyclic hydrocarbon compounds, such as naphthalene, phenanthrene, anthracene, triphenylene, pyrene, perylene, pentafen, and pentacene, and derivatives thereof (for example, carboxylates, carboxylic anhydrides, and carboximides of the above compounds), and mixtures thereof can also be used as the organic material. Furthermore, condensed heterocyclic compounds such as acenaphthylene, indole, isoindole, quinoline, isoquinoline, quinoxaline, phthalazine, carbazole, acridine, phenazine, and phenanthridine, derivatives thereof, and mixtures thereof are also applicable.

For example, the following treatments are performed in order to produce desired artificial graphite using the above organic material as the starting material. First, the starting material is carbonized at a temperature of 300° C. to 700° C. in inert gas current such as nitrogen, and then the temperature is increased to a range from 900° C. to 1500° C. at a temperature increase rate of 1° C. to 100° C. per minute and held at the temperature from 0 to 30 hours for calcination. Next, it is heated at 2000° C. or more and preferably 2500° C. or more and holds at this temperature for a proper period to obtain the desired artificial graphite. Operations of the carbonization and the calcination in the above treatments can be eliminated. In addition, graphitizing carbon is produced when the calcination process in the above treatments is completed.

The artificial graphite produced in the above way is ground and classified to provide the negative electrode material, and the grinding may be performed before or after the carbonization or the calcinations, or during the process of increasing the temperature before the graphitization. In these cases, the heat treatment for the graphitization is finally performed on the obtained powder-form materials. It should be noticed that it is preferable that a graphitized molded object is obtained by molding and heat-treating a raw material for graphitization, and that the obtained object is ground and classified, in order to obtain graphite powder with high bulk density and breaking strength. Generally, the graphitized molded object is obtained by mixing and molding coke used as a filler and a binder pitch used as a binder or a sintering agent, repeating several times a firing step of heat treatment of the molded object at a low temperature of 1000° C. or less and an impregnating step of impregnating it in a binder pitch, and then heat-treating it at a high temperature. The graphitized molded object provides ground powder with high bulk density because of its high hardness, and provides easily the material with high breaking strength because the object has suitable holes. Furthermore, the graphitized molded object is graphitized polycrystal, because the filler (coke) and the binder pitch are used as the raw material, and elements such as sulfur and nitrogen, which are included in the raw material, are emitted as gas at the heat treatment. Therefore the fine holes are formed in paths of the gas. These holes provide advantages of easily proceeding the reaction of inserting and extracting lithium, and high efficiency in industrial treatments. In addition, fillers having moldability and sintering ability can be used as the raw material of the graphitized molded object. In this case, the binder pitch is unnecessary.

The separator 23 is made of a porous film which is made of a polyolefin material such as polypropylene or polyethylene, or a ceramic porous film, or may have a structure where two or more kinds of these porous films are laminated. Particularly, the separator 23 is preferably made of a micro porous film having a two-layer structure of polyethylene and polypropylene, a micro porous film made of a copolymer of polyethylene and polypropylene, a micro porous film made of a mixture of polyethylene and polypropylene, a micro porous film having a three-layer structure of polypropylene, polyethylene and polypropylene, or a micro porous film having polyethylene and an aromatic polyamide, because combination thereof with the following electrolyte can improve more high temperature characteristics.

The separator 23 is impregnated with a liquid electrolyte. The electrolyte contains a liquid solvent, for example, a nonaqueous solvent such as an organic solvent, and a lithium salt which is an electrolyte salt dissolved in the nonaqueous solvent. Applicable examples of the nonaqueous solvent can include propylene carbonate, ethylene carbonate, diethyl carbonate, dimethyl carbonate, 1,2-dimethoxy ethane, 1,2-diethoxy ethane, γ-butyrolactone, tetrahydrofuran, 2-methyl tetrahydrofuran, 1,3-dioxolane, 4-methyl-1,3-dioxolane, diethyl ether, sulfolane, methyl sulfolane, acetonitrile, propionitrile, anisole, acetic ester, butyric ester, and propionic ester.

Applicable lithium salts can include $LiClO_4$, $LiAsF_6$, $LiPF_6$, $LiBF_4$, $LiB(C_6H_5)_4$, $LiCH_3SO_3$, $LiN(CF_3SO_2)_2$, $LiC(CF_3SO_2)_3$, LiCl, and LiBr, for example. Particularly, using $LiPF_6$ can provide high ion conductivity, so it is preferable.

It should be noticed that the electrolytes, which can be used for the secondary battery of the embodiment, can include not only the liquid electrolyte where the electrolyte salt is dissolved in the nonaqueous solvent, but also a gel-type electrolyte where a high molecular compound is impregnated with a nonaqueous solvent and an electrolyte salt. The high molecular compounds can include fluoropolymers such as polyvinylidene fluoride and a copolymer of polyvinylidene fluoride and hexafluoropropylene, ether polymers such as polyethylene oxide and bridging materials thereof, and polyacrylonitrile, for example. Particularly, it is preferable to use the fluoropolymers because of their redox stability. Such a host high molecular compound impregnated with the electrolyte salt provides ion conductivity.

Furthermore, inorganic solid electrolytes and polymer solid electrolytes which have lithium ion conductivity can be used in the secondary battery of the embodiment. The inorganic solid electrolytes can include ones made of lithium nitride and lithium iodide, for example. The polymer solid electrolyte contains an electrolyte salt and a high molecular compound for dissolving the electrolyte salt. The high molecular compounds can include ether polymers such as polyethylene oxide and bridging materials thereof, polymethacrylate ester polymers, acrylate polymers, copolymers thereof, and mixtures thereof.

An anion expressed by a general formula shown in Chemical formula 3 is contained in the electrolyte of the secondary battery of the embodiment:

[Chemical Formula 3]

$(PF_aQ_bR_c)^-$ (wherein, P expresses phosphorous element, F expresses fluorine element, Q expresses at least one selected from the group consisting of $CF_3$, $C_2F_5$, and $C_3F_7$, and R expresses $SO_2CF_3$ and/or $SO_2C_2F_5$, and a, b and c satisfy $1 \leq a \leq 5$, $0 \leq b \leq 5$, and $0 \leq c \leq 5$, respectively).

The anion expressed by Chemical formula 3 exhibits a function of preventing degradation of the electrolyte, and particularly degradation of the nonaqueous solvent, even if the battery is exposed to high temperature atmospheres. The anion expressed by Chemical formula 3 may be added as a lithium salt, and in this case, the lithium salt may be used as the electrolyte salt instead of the above lithium salts. In addition, using a mixture of the anion expressed by Chemical formula 3 and other lithium salt such as the above-described one provides more excellent high temperature storage characteristics, which is preferable. Particularly, combination with $LiPF_6$ is preferable, and for example, a molar ratio of the anion expressed by Chemical formula 3 to $PF_6^-$ in the combination, is preferably not less than 0.1 to 1 nor more than 1000 to 1, and more preferably not less than 0.3 to 1 nor more than 500 to 1. This is clear from results of capacity recovery rate after storage and heavy load discharge maintenance rate in Examples 1-1 to 1-26 shown in FIG. 3 described later.

Furthermore, in the secondary battery of the embodiment, an anion expressed by the following Chemical formula 4 may be contained in the electrolyte:

[Chemical Formula 4]

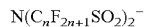

$N(C_nF_{2n+1}SO_2)_2^-$ (wherein, N expresses nitrogen element, C expresses carbon element, F expresses fluorine element, S expresses sulfur element, and O expresses oxygen element, and n satisfies $1 \leq n \leq 2$).

The anion expressed by Chemical formula 4 has a function of preventing degradation of the electrolyte, and particularly degradation of the nonaqueous solvent, even if the battery is exposed to high temperature atmospheres and charge and discharge is repeated. Therefore, containing the anion expressed by Chemical formula 4 in addition to the anion expressed by Chemical formula 3 is preferable, because this can improves more high temperature characteristics, and particularly cycle characteristics at high temperatures. The anion expressed by Chemical formula 4 may be added as a lithium salt like the anion expressed by Chemical formula 3. In addition, as described above, using its mixture with other lithium salt is preferable, and particularly, combination with $LiPF_6$ is preferable. For example, a total molar ratio of the anions expressed by Chemical formulas 3 and 4, that is, $(PF_aQ_bR_c)^-$ and $N(C_nF_{2n+1}SO_2)_2^-$ to $PF_6^-$ in the combination, is preferably not less than 0.1 to 1 nor more than 1000 to 1, and, more preferably not less than 0.3 to 1 nor more than 50 to 1. This is clear from results of capacity recovery rate after storage, heavy load discharge maintenance rate, and capacity maintenance rate after 200 cycles in Examples shown in Tables 6 to 9 described later.

<Method of Manufacturing the Secondary Battery>

The secondary battery can be manufactured as follows, for example.

First, for example, the positive electrode material which can insert and extract lithium, the conductive agent, and the binding agent are mixed to prepare a positive electrode mixture, and the positive electrode mixture is dispersed in a solvent such as N-methyl-2-pyrrolidone to provide a paste-like positive electrode mixture slurry. The positive electrode mixture slurry is applied to the positive electrode collector 21A, the solvent is dried, and then the positive active material layer 21B is formed using compression molding with a roller press machine or the like, to provide the positive electrode 21.

Next, for example, the negative electrode material which can insert and extract lithium and the binding agent are mixed to prepare a negative electrode mixture, and the negative electrode mixture is dispersed in a solvent such as N-methyl-2-pyrrolidone to provide a paste-like negative electrode mixture slurry. The negative electrode mixture slurry is applied to the negative electrode collector 22A, the solvent is dried, and then the negative active material layer 22B is formed using compression molding with a roller press machine or the like, to provide the negative electrode 22.

Then, the positive electrode lead 25 is fixed to the positive electrode collector 21A with welding or the like, and the negative electrode lead 26 is fixed to the negative electrode collector 22A with welding or the like. After that, the positive electrode 21 and the negative electrode 22 are wound sandwiching the separator 23 therebetween, a tip portion of the positive electrode lead 25 is welded to the safety valve mechanism 15, a tip portion of the negative electrode lead 26 is welded to the battery can 11, and the wound positive electrode 21 and negative electrode 22 are sandwiched between a pair of the insulating plates 12 and 13 and are housed inside the battery can 11. After housing the spiral electrode body 20 inside the battery can 11, the electrolyte is injected into the battery can 11 with a reduced pressure method to impregnate the separator 23. Next, the battery lid 14, the safety valve mechanism 15, and the PTC element 16 are caulked and fixed to an opening end of the battery can 11 through the gasket 17. Thereby, the secondary battery tightly sealed inside the battery shown in FIG. 1 is formed.

As described above, according to the embodiment, the electrolyte containing the anion expressed by Chemical formula 3 can prevent the degradation of the electrolyte, and provides the secondary battery which has high capacity recovery rate after storage at high temperatures, and excellent heavy load discharge characteristics after storage.

Particularly, the electrolyte containing the anion expressed by Chemical formula 4 can provide the secondary battery having higher capacity recovery rate after storage at high temperatures, and more excellent heavy load discharge characteristics after storage.

Furthermore, the negative electrode contains at least one selected from the group consisting of lithium, the carbon materials which can insert and extract lithium, and the elementary substances, the alloys, and the compounds of the metallic elements and the metalloid elements which can form an alloy with lithium, so the secondary battery with high capacities can be obtained. Particularly, the above alloys and compounds, which contain at least one kind selected from the first element group consisting of the metallic elements and the metalloid elements which can form an alloy with lithium, and at least one kind selected from the second element group consisting of the metallic elements and the metalloid elements except for the first element group and lithium, relieve the volume change of the alloy particles, and improve more the reliability of the charge and discharge cycle characteristic.

Furthermore, the separator 23, which is made of a micro porous film having a two-layer structure of polyethylene and polypropylene, a micro porous film made of a copolymer of polyethylene and polypropylene, a micro porous film made of a mixture of polyethylene and polypropylene, a micro porous film having a three-layer structure of polypropylene, polyethylene and polypropylene, or a micro porous film having polyethylene and aromatic polyamide, can prevent degradation of the electrolyte and deterioration of the separator 23, and provide the secondary battery having higher capacity recovery rate after storage at high temperatures, more excellent heavy load discharge characteristics after storage, and more excellent charge and discharge characteristics in high temperature atmospheres.

EXAMPLES

Furthermore, concrete examples of the invention will be described in detail.

Examples 1-1 to 1-63

The same cylinder type secondary batteries as the secondary battery shown in FIGS. 1 and 2 were produced as follows. Here, they will be described using the same symbols with reference to FIGS. 1 and 2.

First, lithium carbonate ($Li_2CO_3$) and cobalt carbonate ($CoCO_3$) were mixed at a ratio of $Li_2CO_3$: $CoCO_3$=0.5:1.0 (molar ratio), and fired for about 5 hours at about 900° C. in the air to obtain lithium cobalt composite oxide ($LiCoO_2$) as the positive active material. Subsequently, the lithium cobalt composite oxide was ground to obtain powder with 50% cumulative particle size of 15 μm which was obtained by the laser diffractometry. In addition, X-ray diffraction measurement was performed on the above-obtained powder, and this has revealed that the pattern thereof agreed with the X-ray diffraction pattern of $LiCoO_2$ in the JCPDS (Joint Committee of Powder Diffraction Standard) file. Furthermore, 95 weight parts of the lithium cobalt composite oxide powder and 5 weight parts of lithium carbonate powder were mixed, and 91 weight parts of the mixture, 6 weight parts of graphite as the conductive agent, and 3 weight parts of polyvinylidene fluoride as the binding agent were mixed to prepare a positive electrode mixture. Then, the positive electrode mixture was dispersed in N-methyl pyrrolidone as the solvent to obtain slurry (paste), it was uniformly applied to both sides of a positive electrode collector 21A made of band-like aluminum foil having a thickness of about 20 μm and strip-like convex sections on surfaces thereof, dried, and then, compressed and molded to form a positive active material layer 21B, in order to prepare a band-like positive electrode 21. Then, the positive electrode lead 25 made of aluminum was fixed to one end of the positive electrode collector 21A, for example.

On the other hand, a negative electrode was produced as follows. First, 50 weight parts of petroleum pitch used as the binder was added to 100 weight parts of coal coke used as the filler and mixed at about 100° C., and the mixture was compressed and molded to prepare a precursor of a carbon molded object. The precursor was heat-treated at 1000° C. or less to obtain the carbon molded object, binder pitch which was fused at 200° C. or less was impregnated, and the object was heat-treated (fired) at 1000° C. or less. The impregnating step and firing step were repeated several times. After this, the carbon molded object was heat-treated at a maximum temperature set to about 3000° C. in an inert atmosphere, to obtain a graphitized molded object. The obtained graphitized molded object was ground to be powdered with a ball mill or the like.

90 weight parts of the above obtained graphite powder and 10 weight parts of polyvinylidene fluoride as the binding agent were mixed to prepare a negative electrode mixture. Then, the negative electrode mixture was dispersed in N-methylpyrrolidone as the solvent to obtain slurry (paste). Next, the negative electrode mixture slurry was uniformly applied to both sides of a negative electrode collector 22A made of band-like copper foil having a thickness of about 15 μm and strip-like convex sections on surfaces thereof, dried, and then, compressed and molded to form a negative active material layer 22B, in order to prepare a band-like negative electrode 22. Then, the negative electrode lead 26 made of nickel was fixed to one end of the negative electrode collector 22A, for example.

Then, the separator 23 made of a micro porous polypropylene film with a thickness of about 25 μm was prepared, and the negative electrode 22, the separator 23, the positive electrode 21, and the separator 23 were laminated in the order to form a laminated object. The laminated object was wound many times to be a spiral shape and fixed with an adhesive tape or the like, to prepare a spiral electrode body 20 with an outer diameter of about 18 mm. Then, the spiral electrode body 20 was sandwiched between a pair of insulating plates 12 and 13 and the negative electrode lead 26 was welded to a battery can 11 made of nickel plated iron, the positive electrode lead 25 was welded to the safety valve mechanism 15, and the spiral electrode body 20 was housed inside the battery can 11.

After this, a liquid electrolyte was injected into the battery can 11 with a reduced pressure method. The electrolyte was obtained by dissolving an electrolyte salt, which is a lithium salt mixture of $PF_6^-$ and $(PF_aQ_bR_c)^-$ expressed by Chemical Formula 3 at each predetermined concentration ratio shown in Tables 1-5, into a mixed solvent of ethylene carbonate (EC) and dimethyl carbonate (DMC) with a volume ratio of 1:1. Here, a concentration of the whole electrolyte salt being dissolved into the solvent was 1 mol/dm³. Furthermore, the safety valve mechanism 15, the PTC element 16, and the battery lid 14 were fixed by caulking the battery can 11 through a gasket 17 in which asphalt is applied on surfaces thereof, to obtain the cylinder type nonaqueous secondary battery with a diameter of 18 mm and a height of 65 mm which is tightly sealed.

Using the secondary batteries produced as described above, battery capacities before storage were measured after discharging to a final voltage 2.5 V at a constant current of 1.0 A. Then, constant current and voltage charging was performed again on the conditions of a maximum charging voltage of 4.2 V and a constant current of 1.0 A and a charge time of 5 h, and the batteries were stored for 14 days at 55° C. in the charged state. Then, the stored batteries were left at room temperature, and were discharged to a final voltage of 2.5 V at a constant current of 1.0 A. Then, one cycle of a charge and discharge was performed on the above conditions, and recovered capacities after storage were measured. Moreover, the batteries were charged again and discharged at a constant current of 3.0 A and heavy load capacities thereof were measured. Using the measured values which were obtained as described above, capacity recovery rate after storage was calculated by dividing the recovered capacity after storage by the battery capacity before storage, and heavy load discharge maintenance rate was calculated by dividing the heavy load capacity by the recovered capacity after storage. Results thereof are shown in Tables 1 to 5.

Hereinafter, Tables 1 to 5 are shown in turn, and Examples 1-1 to 1-63 will be described in detail. Comparative example 1 which is a secondary battery, where the electrolyte does not contain the anion expressed by Chemical formula 3 as the electrolyte salt, is also shown in Tables 1 to 5 as a comparative example of Example 1-1 to 1-63. Comparative example 1 is the same as Examples 1-1 to 1-63 except for using $LiPF_6$ of 1 mol/dm³ as the electrolyte salt.

TABLE 1

|  | molar ratio (ratio of $PF_aQ_bR_c$ to $PF_6$) | a | Q | b | R | c | concentration of the whole electrolyte salt mol/dm³ | capacity recovery rate after storage % | heavy load discharge maintenance rate % |
| --- | --- | --- | --- | --- | --- | --- | --- | --- | --- |
| Example 1-1 | 0.1 | 3 | $C_2F_5$ | 3 | — | 0 | 1 | 91 | 81 |
| Example 1-2 | 0.3 | 3 | $C_2F_5$ | 3 | — | 0 | 1 | 92 | 82 |
| Example 1-3 | 0.5 | 3 | $C_2F_5$ | 3 | — | 0 | 1 | 93 | 84 |
| Example 1-4 | 1 | 3 | $C_2F_5$ | 3 | — | 0 | 1 | 94 | 86 |
| Example 1-5 | 2 | 3 | $C_2F_5$ | 3 | — | 0 | 1 | 94 | 87 |
| Example 1-6 | 5 | 3 | $C_2F_5$ | 3 | — | 0 | 1 | 94 | 87 |
| Example 1-7 | 8 | 3 | $C_2F_5$ | 3 | — | 0 | 1 | 94 | 86 |
| Example 1-8 | 10 | 3 | $C_2F_5$ | 3 | — | 0 | 1 | 94 | 85 |
| Example 1-9 | 50 | 3 | $C_2F_5$ | 3 | — | 0 | 1 | 95 | 83 |
| Example 1-10 | 100 | 3 | $C_2F_5$ | 3 | — | 0 | 1 | 95 | 82 |
| Example 1-11 | 1000 | 3 | $C_2F_5$ | 3 | — | 0 | 1 | 95 | 82 |
| Example 1-12 | 5000 | 3 | $C_2F_5$ | 3 | — | 0 | 1 | 95 | 81 |
| Example 1-13 | 10000 | 3 | $C_2F_5$ | 3 | — | 0 | 1 | 95 | 78 |
| Example 1-14 | 0.1 | 3 | — | 0 | $SO_2CF_3$ | 3 | 1 | 91 | 81 |
| Example 1-15 | 0.3 | 3 | — | 0 | $SO_2CF_3$ | 3 | 1 | 93 | 83 |
| Example 1-16 | 0.5 | 3 | — | 0 | $SO_2CF_3$ | 3 | 1 | 94 | 84 |
| Example 1-17 | 1 | 3 | — | 0 | $SO_2CF_3$ | 3 | 1 | 94 | 85 |
| Example 1-18 | 2 | 3 | — | 0 | $SO_2CF_3$ | 3 | 1 | 94 | 86 |
| Example 1-19 | 5 | 3 | — | 0 | $SO_2CF_3$ | 3 | 1 | 94 | 86 |
| Example 1-20 | 8 | 3 | — | 0 | $SO_2CF_3$ | 3 | 1 | 94 | 86 |
| Example 1-21 | 10 | 3 | — | 0 | $SO_2CF_3$ | 3 | 1 | 94 | 85 |
| Example 1-22 | 50 | 3 | — | 0 | $SO_2CF_3$ | 3 | 1 | 94 | 84 |
| Example 1-23 | 100 | 3 | — | 0 | $SO_2CF_3$ | 3 | 1 | 95 | 83 |
| Example 1-24 | 1000 | 3 | — | 0 | $SO_2CF_3$ | 3 | 1 | 95 | 82 |

TABLE 1-continued

| | molar ratio (ratio of $PF_aQ_bR_c$ to $PF_6$) | a | Q | b | R | c | concentration of the whole electrolyte salt mol/dm³ | capacity recovery rate after storage % | heavy load discharge maintenance rate % |
|---|---|---|---|---|---|---|---|---|---|
| Example 1-25 | 5000 | 3 | — | 0 | $SO_2CF_3$ | 3 | 1 | 95 | 81 |
| Example 1-26 | 10000 | 3 | — | 0 | $SO_2CF_3$ | 3 | 1 | 95 | 80 |
| Comparative example 1 | — | — | — | — | — | — | 1 ($LiPF_6$) | 90 | 80 |

Figure 3:
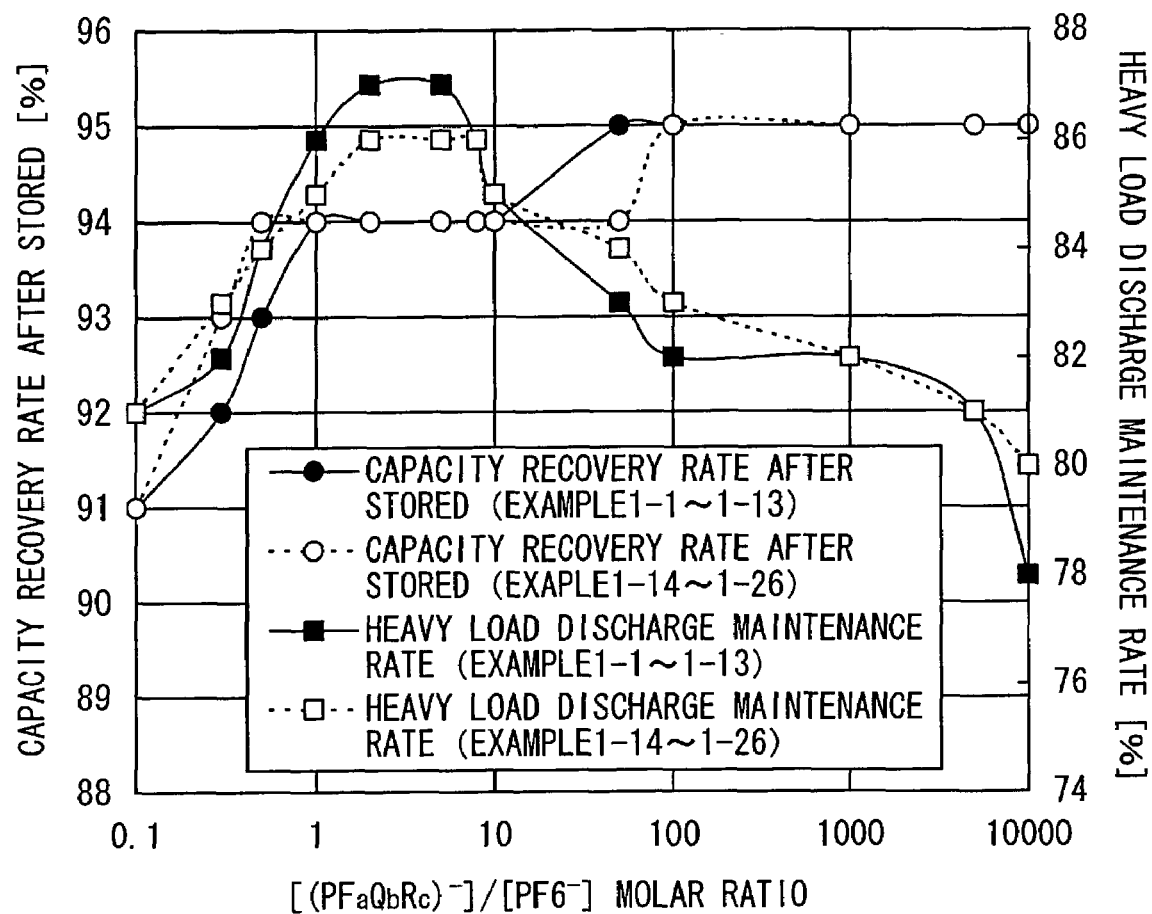
FIG. 3 is a characteristic view showing summarized experimental results of Examples 1-1 to 1-26.

FIG. 3 corresponds to Examples 1-1 to 1-26, and is a characteristic view showing dependences of the capacity recovery rate after storage and the heavy load discharge maintenance rate on ratios (molar ratios) of $[(PF_aQ_bR_c)^-]/[PF_6^-]$. The horizontal axis represents the molar ratios of $[(PF_aQ_bR_c)^-]/[PF_6^-]$, the left vertical axis represents the capacity recovery rate after storage, and right vertical axis represents the heavy load discharge maintenance rate.

Example 1-1 to 1-13 are results of examining characteristics of the batteries formed using various molar ratios of $(PF_3(C_2F_5)_3)^-$ to $PF_6^-$ ranging from 0.1 to 10000 as shown in Table 1. As shown in Table 1, the capacity recovery rate after storage increased monotonically from 91% to 95%, as the molar ratio of $(PF_3(C_2F_5)_3)^-$ increased. The heavy load discharge maintenance rate exhibited a local maximum value of 87% at the molar ratios of $(PF_3(C_2F_5)_3)^-$ of around 2 and 5, at which points decreased.

Examples 1-14 to 1-26 are results of examining characteristics of the batteries formed using various molar ratios of $(PF_3(SO_2CF_3)_3)^-$ to $PF_6^-$ ranging from 0.1 to 10000 as shown in Table 1. As shown in Table 1, the capacity recovery rate after storage increased monotonically from 91% to 95%, as the molar ratio of $(PF_3(SO_2CF_3)_3)^-$ increased. The heavy load discharge maintenance rate exhibited a maximum value of 86% at the molar ratios of $(PF_3(SO_2CF_3)_3)^-$ of around 2 to 8, at which points decreases.

Summarizing the above results of Examples 1-1 to 1-26, adding the anion of $(PF_3(C_2F_5)_3)^-$ or $(PF_3(SO_2CF_3)_3)^-$ to the electrolyte provided the high capacity recovery rate after storage and equivalent or higher heavy load discharge maintenance rate, compared with Comparative example 1. Particularly, adding $(PF_3(C_2F_5)_3)^-$ at the molar ratios of around 2 to 5 is preferable, because both of the capacity recovery rate after storage and the heavy load discharge maintenance rate exhibited higher values. Adding $(PF_3(SO_2CF_3)_3)^-$ at the molar ratios of around 2 to 8 is preferable, because both of the capacity recovery rate after storage and the heavy load discharge maintenance rate exhibited higher values.

TABLE 2

| | molar ratio (ratio of $PF_aQ_bR_c$ to $PF_6$) | a | Q | B | R | c | concentration of the whole electrolyte salt mol/dm³ | capacity recovery rate after storage % | heavy load discharge maintenance rate % |
|---|---|---|---|---|---|---|---|---|---|
| Example 1-27 | 0.5 | 1 | $CF_3$ | 5 | — | — | 1 | 93 | 83 |
| Example 1-28 | 0.5 | 1 | $C_2F_5$ | 5 | — | — | 1 | 93 | 84 |
| Example 1-29 | 0.5 | 1 | $C_3F_7$ | 5 | — | — | 1 | 93 | 83 |
| Example 1-30 | 0.5 | 1 | — | — | $SO_2CF_3$ | 5 | 1 | 94 | 84 |
| Example 1-31 | 0.5 | 1 | — | — | $SO_2C_2F_5$ | 5 | 1 | 94 | 83 |
| Example 1-32 | 0.5 | 2 | $C_2F_5$ | 4 | — | — | 1 | 92 | 83 |
| Example 1-33 | 0.5 | 3 | $C_2F_5$ | 3 | — | — | 1 | 92 | 83 |
| Example 1-34 | 0.5 | 4 | $C_2F_5$ | 2 | — | — | 1 | 93 | 83 |
| Example 1-35 | 0.5 | 5 | $C_2F_5$ | 1 | — | — | 1 | 92 | 83 |
| Example 1-36 | 0.5 | 2 | — | — | $SO_2CF_3$ | 4 | 1 | 93 | 84 |
| Example 1-37 | 0.5 | 3 | — | — | $SO_2CF_3$ | 3 | 1 | 94 | 84 |
| Example 1-38 | 0.5 | 4 | — | — | $SO_2CF_3$ | 2 | 1 | 94 | 84 |
| Example 1-39 | 0.5 | 5 | — | — | $SO_2CF_3$ | 1 | 1 | 94 | 84 |
| Comparative example 1 | — | — | — | — | — | — | 1 ($LiPF_6$) | 90 | 80 |

Examples 1-27 to 1-39 are examples when using $(PFQ_5)^-$ for the added anion expressed by Chemical formula 3. Here, Q expresses $CF_3$ (Example 1-27), $C_2F_5$ (Example 1-28), or $C_3F_7$ (Example 1-29) as shown in Table 2. Each of their capacity recovery rates after storage was 93%, and each of their heavy load discharge maintenance rates was 83% or 84%. The molar ratio of $(PFQ_5)^-$ to $PF_6^-$ was set to 0.5 in these Examples.

Examples 1-30 and 1-31 are examples when using $(PFR_5)^-$ for the added anion expressed by Chemical formula 3. Here, R expresses $SO_2CF_3$ (Example 1-30) or $SO_2C_2F_5$ (Example 1-31) as shown in Table 2. Each of their capacity recovery rates after storage was 93%, and each of their heavy load discharge maintenance rates was 83% or 84%. The molar ratio of $(PFR_5)^-$ to $PF_6^-$ was set to 0.5 in these Examples.

Examples 1-32 to 1-35 are examples when using $(PF_a(C_2F_5)_b)^-$ for the added anion expressed by Chemical formula 3, wherein a+b was 6 and values "a" of Examples 1-32, 1-33, 1-34 and 1-35 were 2, 3, 4, and 5, respectively. Each of their capacity recovery rates after storage was 92% or 93%, and each of their heavy load discharge maintenance rates was 83%. The molar ratio of $(PF_a(C_2F_5)_b)^-$ to $PF_6^-$ was set to 0.5 in these Examples.

Examples 1-36 to 1-39 are results of examining properties when using $(PF_a(SO_2CF_3)_c)^-$ for the added anion expressed by Chemical formula 3, wherein a+c was 6 and values "a" of Examples 1-36, 1-37, 1-38, and 1-39 were 2, 3, 4, and 5, respectively. Each of their capacity recovery rates after storage was 93% or 94%, and each of their heavy load discharge maintenance rates was 84%. The molar ratio of $PF_a(SO_2CF_3)_c)^-$ to $PF_6^-$ was set to 0.5 in these Examples.

TABLE 3

| | molar ratio (ratio of $PF_aQ_bR_c$ to $PF_6$) | a | Q | b | R | c | concentration of the whole electrolyte salt mol/dm$^3$ | capacity recovery rate after storage % | heavy load discharge maintenance rate % |
|---|---|---|---|---|---|---|---|---|---|
| Example 1-40 | 0.5 | 2 | $CF_3:C_2F_5$ = 1:3 | 4 | — | — | 1 | 93 | 83 |
| Example 1-41 | 0.5 | 2 | $CF_3:C_2F_5$ = 2:2 | 4 | — | — | 1 | 93 | 83 |
| Example 1-42 | 0.5 | 2 | $CF_3:C_2F_5$ = 3:1 | 4 | — | — | 1 | 93 | 83 |
| Example 1-43 | 0.5 | 3 | $CF_3:C_2F_5$ = 1:2 | 3 | — | — | 1 | 93 | 83 |
| Example 1-44 | 0.5 | 3 | $CF_3:C_2F_5$ = 2:1 | 3 | — | — | 1 | 94 | 83 |
| Example 1-45 | 0.5 | 4 | $CF_3:C_2F_5$ = 1:1 | 2 | — | — | 1 | 94 | 83 |
| Example 1-46 | 0.5 | 3 | $CF_3:C_3F_7$ = 2:1 | 3 | — | — | 1 | 94 | 83 |
| Example 1-47 | 0.5 | 3 | $C_2F_5:C_3F_7$ = 2:1 | 3 | — | — | 1 | 94 | 83 |
| Comparative example 1 | — | — | — | — | — | — | 1 (LiPF$_6$) | 90 | 80 |

Examples 1-40 to 1-47 shown in Table 3 are results of examining properties when using $(PF_aQ_b)^-$ for the added anion expressed by Chemical formula 3, wherein a+b was 6 and values "a" of Examples 1-40 to 1-47 were 2, 2, 2, 3, 3, 4, 3 and 3, respectively. Qs of Examples 1-40, 1-41, 1-42, 1-43, 1-44, and 1-45 express materials containing $CF_3$ and $C_2F_5$ respectively with ratios of 1:3, 2:2, 3:1, 1:2, 2:1 and 1:1. And, Q of Example 1-46 expresses a material containing $CF_3$ and $C_3F_7$ with a ratio of 2:1, and Q of Example 1-47 expresses a material containing $C_2F_5$ and $C_3F_7$ with a ratio of 2:1. Each of their capacity recovery rates after storage was 93% or 94%, and each of their heavy load discharge maintenance rates was 83%. The molar ratio of $(PF_aQ_b)^-$ to $PF_6^-$ was set to 0.5 in these Examples.

TABLE 4

| | molar ratio (ratio of $PF_aQ_bR_c$ to $PF_6$) | a | Q | b | R | c | concentration of the whole electrolyte salt mol/dm$^3$ | capacity recovery rate after storage % | heavy load discharge maintenance rate % |
|---|---|---|---|---|---|---|---|---|---|
| Example 1-48 | 0.5 | 2 | — | — | $SO_2CF_3:SO_2C_2F_5$ = 1:3 | 4 | 1 | 94 | 84 |
| Example 1-49 | 0.5 | 2 | — | — | $SO_2CF_3:SO_2C_2F_5$ = 2:2 | 4 | 1 | 94 | 84 |
| Example 1-50 | 0.5 | 2 | — | — | $SO_2CF_3:SO_2C_2F_5$ = 3:1 | 4 | 1 | 94 | 84 |
| Example 1-51 | 0.5 | 3 | — | — | $SO_2CF_3:SO_2C_2F_5$ = 1:2 | 3 | 1 | 94 | 84 |
| Example 1-52 | 0.5 | 3 | — | — | $SO_2CF_3:SO_2C_2F_5$ = 2:1 | 3 | 1 | 94 | 84 |
| Example 1-53 | 0.5 | 4 | — | — | $SO_2CF_3:SO_2C_2F_5$ = 1:1 | 2 | 1 | 94 | 84 |
| Comparative example 1 | — | — | — | — | — | — | 1 (LiPF$_6$) | 90 | 80 |

Examples 1-48 to 1-53 shown in Table 4 are results of examining properties when using $(PF_aR_c)^-$ for the added anion expressed by Chemical formula 3, wherein a+c was 6 and values "a" of Examples 1-48 to 1-53 were 2, 2, 2, 3, 3, and 4, respectively. Rs of Examples 1-48, 1-49, 1-50, 1-51, 1-52, and 1-53 express materials containing $SO_2CF_3$ and $SO_2C_2F_5$ respectively with ratios of 1:3, 2:2, 3:1, 1:2, 2:1 and 1:1. Each of their capacity recovery rates after storage was 94%, and each of their heavy load discharge maintenance rates was 84%. The molar ratio of $(PF_aR_c)^-$ to $PF_6^-$ was set to 0.5 in these Examples.

TABLE 5

| | molar ratio (ratio of $PF_aQ_bR_c$ to $PF_6$) | a | Q | b | R | c | concentration of the whole electrolyte salt mol/dm³ | capacity recovery rate after storage % | heavy load discharge maintenance rate % |
|---|---|---|---|---|---|---|---|---|---|
| Example 1-54 | 0.5 | 1 | $C_2F_5$ | 4 | $SO_2CF_3$ | 1 | 1 | 94 | 85 |
| Example 1-55 | 0.5 | 1 | $C_2F_5$ | 3 | $SO_2CF_3$ | 2 | 1 | 94 | 84 |
| Example 1-56 | 0.5 | 1 | $C_2F_5$ | 2 | $SO_2CF_3$ | 3 | 1 | 94 | 84 |
| Example 1-57 | 0.5 | 1 | $C_2F_5$ | 1 | $SO_2CF_3$ | 4 | 1 | 94 | 84 |
| Example 1-58 | 0.5 | 2 | $C_2F_5$ | 1 | $SO_2CF_3$ | 3 | 1 | 94 | 85 |
| Example 1-59 | 0.5 | 2 | $C_2F_5$ | 2 | $SO_2CF_3$ | 2 | 1 | 94 | 84 |
| Example 1-60 | 0.5 | 2 | $C_2F_5$ | 3 | $SO_2CF_3$ | 1 | 1 | 94 | 84 |
| Example 1-61 | 0.5 | 3 | $C_2F_5$ | 1 | $SO_2CF_3$ | 2 | 1 | 94 | 84 |
| Example 1-62 | 0.5 | 3 | $C_2F_5$ | 2 | $SO_2CF_3$ | 1 | 1 | 94 | 84 |
| Example 1-63 | 0.5 | 4 | $C_2F_5$ | 1 | $SO_2CF_3$ | 1 | 1 | 94 | 84 |
| Comparative example 1 | — | — | — | — | — | — | 1 ($LiPF_6$) | 90 | 80 |

Examples 1-54 to 1-63 shown in Table 5 are results of examining properties when using $(PF_a(C_2F_5)_b(SO_2CF_3)_c)^-$ for the added anion expressed by Chemical formula 3, wherein a+b+c was 6 and values "a" of Examples 1-54 to 1-63 were 1, 1, 1, 1, 2, 2, 2, 3, 3, and 4, respectively. Similarly, values "b" of Examples 1-54 to 1-63 was set to 4, 3, 2, 1, 1, 2, 3, 1, 2, and 1, respectively. Each of their capacity recovery rates after storage was 94%, and each of their heavy load discharge maintenance rates was 84% or 85%. The molar ratio of $(PF_a(C_2F_5)_b(SO_2CF_3)_c)^-$ to $PF_6^-$ was set to 0.5 in these Examples.

Summarizing the above results of Examples 1-27 to 1-63 confirms all the values for the capacity recovery rate after storage and heavy load discharge maintenance rate were higher and improved, compared with Comparative example 1.

Examples 2-1 to 2-74

Except for changing composition of the electrolyte salt, the same cylinder type secondary batteries as the secondary battery shown in FIGS. 1 and 2 were produced like Examples 1-1 to 1-63.

Lithium salts obtained by mixing $PF_6^-$, $(PF_aQ_bR_c)^-$, and $N(C_nF_{2n+1}SO_2)_2^-$ at certain concentration ratios as shown in the following Tables 6 to 9 were used as the electrolyte. Concentration of the whole electrolyte salt is similarly 1 mol/dm³.

"Capacity recovery rate after storage" and "heavy load discharge maintenance rate" were calculated on the same conditions as Examples 1-1 to 1-63 using the produced secondary batteries. Furthermore, using the above secondary batteries, battery capacities before cycle were measured after discharging the batteries to a final voltage of 2.5 V at a constant current of 1.0 A in a 50° C. atmosphere. Then, cycle of constant current and voltage charging in the 50° C. atmosphere on the conditions of a maximum voltage of 4.2 V, a constant current of 1.0A and charge time of 5 h, and discharging to a final voltage of 2.5 V at a constant current of 1.0 A in the 50° C. atmosphere was repeated, and battery capacities after 200 cycles were measured. "Capacity maintenance rate after 200 cycles" was calculated by dividing the obtained battery capacity after 200 cycles by the battery capacity before cycle. Those results are shown in Tables 6 to 9.

In Tables 6 to 9, a molar ratio A expresses a total molar ratio of $(PF_aQ_bR_c)^-$ and $N(C_nF_{2n+1}SO_2)_2^-$ to $PF_6^-$. A molar ratio B expresses a molar ratio of $N(C_nF_{2n+1}SO_2)_2^-$ to $(PF_aQ_bR_c)^-$.

Hereinafter, Tables 6 to 9 will be shown in order, and Examples 2-1 to 2-74 will be described in detail. In addition, Comparative Example 2, which is a secondary battery where an electrolyte contain neither anions expressed by Chemical formulas 3 nor 4 as an electrolyte salt, is also shown in Tables 6 to 9 as Comparative Example of Examples 2-1 to 2-74. Comparative Example 2 is the same as those of Examples 2-1 to 2-74 except for using $LiPF_6$ with a concentration of 1 mol/dm₃ as the electrolyte salt.

TABLE 6

| | Molar ratio A | a | Q | b | R | c | Molar ratio B | n | concentration of the whole electrolyte salt mol/dm³ | capacity recovery rate after storage % | heavy load discharge maintenance rate % | capacity maintenance rate after 200 cycles (50° C.) |
|---|---|---|---|---|---|---|---|---|---|---|---|---|
| Example 2-1 | 0.1 | 3 | $C_2F_5$ | 3 | — | 0 | 0 | 1 | 1 | 91 | 81 | 40 |
| Example 2-2 | 0.1 | 3 | $C_2F_5$ | 3 | — | 0 | 0.5 | 1 | 1 | 93 | 81 | 61 |

TABLE 6-continued

|  | Molar ratio A | a | Q | b | R | c | Molar ratio B | n | concentration of the whole electrolyte salt mol/dm$^3$ | capacity recovery rate after storage % | heavy load discharge maintenance rate % | capacity maintenance rate after 200 cycles (50° C.) |
|---|---|---|---|---|---|---|---|---|---|---|---|---|
| Example 2-3 | 0.3 | 3 | C$_2$F$_5$ | 3 | — | 0 | 0 | 1 | 1 | 92 | 82 | 43 |
| Example 2-4 | 0.3 | 3 | C$_2$F$_5$ | 3 | — | 0 | 0.5 | 1 | 1 | 94 | 82 | 78 |
| Example 2-5 | 0.5 | 3 | C$_2$F$_5$ | 3 | — | 0 | 0 | 1 | 1 | 93 | 84 | 45 |
| Example 2-6 | 0.5 | 3 | C$_2$F$_5$ | 3 | — | 0 | 0.2 | 1 | 1 | 95 | 84 | 72 |
| Example 2-7 | 0.5 | 3 | C$_2$F$_5$ | 3 | — | 0 | 0.4 | 1 | 1 | 96 | 85 | 80 |
| Example 2-8 | 1 | 3 | C$_2$F$_5$ | 3 | — | 0 | 0 | 1 | 1 | 94 | 86 | 48 |
| Example 2-9 | 1 | 3 | C$_2$F$_5$ | 3 | — | 0 | 0.2 | 1 | 1 | 96 | 85 | 81 |
| Example 2-10 | 1 | 3 | C$_2$F$_5$ | 3 | — | 0 | 0.4 | 1 | 1 | 96 | 86 | 85 |
| Example 2-11 | 2 | 3 | C$_2$F$_5$ | 3 | — | 0 | 0 | 1 | 1 | 94 | 87 | 51 |
| Example 2-12 | 2 | 3 | C$_2$F$_5$ | 3 | — | 0 | 0.2 | 1 | 1 | 95 | 87 | 80 |
| Example 2-13 | 5 | 3 | C$_2$F$_5$ | 3 | — | 0 | 0 | 1 | 1 | 94 | 87 | 53 |
| Example 2-14 | 5 | 3 | C$_2$F$_5$ | 3 | — | 0 | 0.2 | 1 | 1 | 96 | 87 | 81 |
| Example 2-15 | 10 | 3 | C$_2$F$_5$ | 3 | — | 0 | 0 | 1 | 1 | 94 | 85 | 57 |
| Example 2-16 | 10 | 3 | C$_2$F$_5$ | 3 | — | 0 | 0.1 | 1 | 1 | 95 | 83 | 73 |
| Example 2-17 | 10 | 3 | C$_2$F$_5$ | 3 | — | 0 | 0.2 | 1 | 1 | 96 | 83 | 82 |
| Example 2-18 | 50 | 3 | C$_2$F$_5$ | 3 | — | 0 | 0 | 1 | 1 | 95 | 83 | 60 |
| Example 2-19 | 50 | 3 | C$_2$F$_5$ | 3 | — | 0 | 0.1 | 1 | 1 | 96 | 83 | 71 |
| Example 2-20 | 50 | 3 | C$_2$F$_5$ | 3 | — | 0 | 0.2 | 1 | 1 | 96 | 84 | 81 |
| Example 2-21 | 100 | 3 | C$_2$F$_5$ | 3 | — | 0 | 0 | 1 | 1 | 95 | 82 | 61 |
| Example 2-22 | 100 | 3 | C$_2$F$_5$ | 3 | — | 0 | 0.1 | 1 | 1 | 95 | 83 | 70 |
| Example 2-23 | 100 | 3 | C$_2$F$_5$ | 3 | — | 0 | 0.2 | 1 | 1 | 96 | 83 | 80 |
| Comparative Example 2 | — | — | — | — | — | — | — | 1 | 1 | 90 | 80 | 30 |

*Molar ratio A expresses a ratio of [PF$_a$Q$_b$R$_c$ + N(C$_n$F$_{2+1}$SO$_2$)$_2$]$^-$ to PF$_6^-$.
*Molar ratio B expresses a ratio of N(C$_n$F$_{2n+1}$SO$_2$)$_2^-$ to (PF$_a$Q$_b$R$_c$)$^-$.

Examples 2-1 to 2-23 shown in Table 6 are examples when using (PF$_3$(C$_2$F$_5$)$_3$)$^-$ for the anion expressed by Chemical formula 3, N(CF$_3$SO$_2$)$_2^-$ for the anion expressed by Chemical formula 4 (n=1), and various total molar ratios A thereof ranging from 0.1 to 100. The molar ratio B of zero means that N(CF$_3$SO$_2$)$_2^-$ is not contained. As shown in Table 6, the capacity recovery rate after storage tended to increase from 91% to 96%, as the molar ratio A increased. Particularly, the capacity recovery rate after storage in the presence of N(CF$_3$SO$_2$)$_2^-$ was about 1 to 3% higher than that in the absence thereof, and reached 96% at the maximum. For example, the capacity recovery rate after storage of Example 2-1 was 91%, and that of Example 2-2, in which the molar ratio B was set to 0.5 by the addition of N(CF$_3$SO$_2$)$_2^-$, was 2% higher and reached 93%.

The heavy load discharge maintenance rate was a maximum value of 87% at the molar ratio A of around 2 and 5. Furthermore, the capacity maintenance rate after 200 cycles in the 50° C. atmosphere increased, as the molar ratio A increased, and particularly, it was about 9 to 37% higher because of the addition of N(CF$_3$SO$_2$)$_2^-$, and reached 85% at the maximum.

TABLE 7

|  | Molar ratio A | a | Q | b | R | c | Molar ratio B | n | concentration of the whole electrolyte salt mol/dm$^3$ | capacity recovery rate after storage % | heavy load discharge maintenance rate % | capacity maintenance rate after 200 cycles (50° C.) |
|---|---|---|---|---|---|---|---|---|---|---|---|---|
| Example 2-24 | 0.1 | 3 | C$_2$F$_5$ | 3 | — | 0 | 0.5 | 2 | 1 | 93 | 81 | 59 |
| Example 2-25 | 0.3 | 3 | C$_2$F$_5$ | 3 | — | 0 | 0.5 | 2 | 1 | 94 | 82 | 76 |
| Example 2-26 | 0.5 | 3 | C$_2$F$_5$ | 3 | — | 0 | 0.2 | 2 | 1 | 95 | 84 | 70 |
| Example 2-27 | 0.5 | 3 | C$_2$F$_5$ | 3 | — | 0 | 0.4 | 2 | 1 | 95 | 84 | 77 |
| Example 2-28 | 1 | 3 | C$_2$F$_5$ | 3 | — | 0 | 0.2 | 2 | 1 | 96 | 85 | 79 |
| Example 2-29 | 1 | 3 | C$_2$F$_5$ | 3 | — | 0 | 0.4 | 2 | 1 | 96 | 86 | 84 |
| Example 2-30 | 2 | 3 | C$_2$F$_5$ | 3 | — | 0 | 0.2 | 2 | 1 | 95 | 87 | 79 |
| Example 2-31 | 5 | 3 | C$_2$F$_5$ | 3 | — | 0 | 0.2 | 2 | 1 | 96 | 86 | 80 |
| Example 2-32 | 10 | 3 | C$_2$F$_5$ | 3 | — | 0 | 0.1 | 2 | 1 | 95 | 82 | 70 |
| Example 2-33 | 10 | 3 | C$_2$F$_5$ | 3 | — | 0 | 0.2 | 2 | 1 | 96 | 83 | 79 |
| Example 2-34 | 50 | 3 | C$_2$F$_5$ | 3 | — | 0 | 0.1 | 2 | 1 | 96 | 82 | 68 |
| Example 2-35 | 50 | 3 | C$_2$F$_5$ | 3 | — | 0 | 0.2 | 2 | 1 | 96 | 83 | 78 |
| Example 2-36 | 100 | 3 | C$_2$F$_5$ | 3 | — | 0 | 0.1 | 2 | 1 | 95 | 82 | 68 |
| Example 2-37 | 100 | 3 | C$_2$F$_5$ | 3 | — | 0 | 0.2 | 2 | 1 | 96 | 82 | 78 |

TABLE 7-continued

|  | Molar ratio A | a | Q | b | R | c | Molar ratio B | n | concentration of the whole electrolyte salt mol/dm³ | capacity recovery rate after storage % | heavy load discharge maintenance rate % | capacity maintenance rate after 200 cycles (50° C.) |
|---|---|---|---|---|---|---|---|---|---|---|---|---|
| Comparative Example 2 | — | — | — | — | — | — | — | — | 1 | 90 | 80 | 30 |

*Molar ratio A expresses a ratio of $[PF_aQ_bR_c + N(C_nF_{2n+1}SO_2)_2]^-$ to $PF_6^-$.
*Molar ratio B expresses a ratio of $N(C_nF_{2n+1}SO_2)_2^-$ to $(PF_aQ_bR_c)^-$.

Examples 2-24 to 2-37 are results of examining properties when using $(PF_3(C_2F_5)_3)^-$ for the anion expressed by Chemical formula 3, $N(C_2F_5SO_2)_2^-$ for the anion expressed by Chemical formula 4 (n=2), and various total molar ratios A thereof ranging from 0.1 to 100 as shown in Table 7. Here, Example 2, because the anions expressed by $(PF_3(C_2F_5)_3)^-$ and $N(C_nF_{2n+1}SO_2)_2^-$ were dissolved in the electrolyte as the electrolyte salt. Particularly, when $N(C_nF_{2n+1}SO_2)_2^-$ was contained, the capacity maintenance rate after 200 cycles was improved dramatically.

TABLE 8

|  | Molar ratio A | a | Q | b | R | c | Molar ratio B | n | concentration of the whole electrolyte salt mol/dm³ | capacity recovery rate after storage % | heavy load discharge maintenance rate % | capacity maintenance rate after 200 cycles (50° C.) |
|---|---|---|---|---|---|---|---|---|---|---|---|---|
| Example 2-38 | 0.1 | 3 | — | 0 | SO₂CF₃ | 3 | 0 | 1 | 1 | 91 | 81 | 40 |
| Example 2-39 | 0.1 | 3 | — | 0 | SO₂CF₃ | 3 | 0.5 | 1 | 1 | 92 | 81 | 60 |
| Example 2-40 | 0.3 | 3 | — | 0 | SO₂CF₃ | 3 | 0 | 1 | 1 | 93 | 83 | 42 |
| Example 2-41 | 0.3 | 3 | — | 0 | SO₂CF₃ | 3 | 0.5 | 1 | 1 | 93 | 83 | 76 |
| Example 2-42 | 0.5 | 3 | — | 0 | SO₂CF₃ | 3 | 0 | 1 | 1 | 94 | 84 | 44 |
| Example 2-43 | 0.5 | 3 | — | 0 | SO₂CF₃ | 3 | 0.2 | 1 | 1 | 94 | 84 | 72 |
| Example 2-44 | 0.5 | 3 | — | 0 | SO₂CF₃ | 3 | 0.4 | 1 | 1 | 95 | 85 | 81 |
| Example 2-45 | 1 | 3 | — | 0 | SO₂CF₃ | 3 | 0 | 1 | 1 | 94 | 85 | 47 |
| Example 2-46 | 1 | 3 | — | 0 | SO₂CF₃ | 3 | 0.2 | 1 | 1 | 96 | 86 | 80 |
| Example 2-47 | 1 | 3 | — | 0 | SO₂CF₃ | 3 | 0.4 | 1 | 1 | 96 | 86 | 84 |
| Example 2-48 | 2 | 3 | — | 0 | SO₂CF₃ | 3 | 0 | 1 | 1 | 94 | 86 | 50 |
| Example 2-49 | 2 | 3 | — | 0 | SO₂CF₃ | 3 | 0.2 | 1 | 1 | 95 | 87 | 80 |
| Example 2-50 | 5 | 3 | — | 0 | SO₂CF₃ | 3 | 0 | 1 | 1 | 94 | 86 | 52 |
| Example 2-51 | 5 | 3 | — | 0 | SO₂CF₃ | 3 | 0.2 | 1 | 1 | 96 | 87 | 80 |
| Example 2-52 | 10 | 3 | — | 0 | SO₂CF₃ | 3 | 0 | 1 | 1 | 94 | 85 | 56 |
| Example 2-53 | 10 | 3 | — | 0 | SO₂CF₃ | 3 | 0.1 | 1 | 1 | 95 | 82 | 71 |
| Example 2-54 | 10 | 3 | — | 0 | SO₂CF₃ | 3 | 0.2 | 1 | 1 | 96 | 84 | 80 |
| Example 2-55 | 50 | 3 | — | 0 | SO₂CF₃ | 3 | 0 | 1 | 1 | 94 | 84 | 58 |
| Example 2-56 | 50 | 3 | — | 0 | SO₂CF₃ | 3 | 0.1 | 1 | 1 | 96 | 83 | 70 |
| Example 2-57 | 50 | 3 | — | 0 | SO₂CF₃ | 3 | 0.2 | 1 | 1 | 96 | 84 | 80 |
| Example 2-58 | 100 | 3 | — | 0 | SO₂CF₃ | 3 | 0 | 1 | 1 | 95 | 83 | 60 |
| Example 2-59 | 100 | 3 | — | 0 | SO₂CF₃ | 3 | 0.1 | 1 | 1 | 95 | 82 | 71 |
| Example 2-60 | 100 | 3 | — | 0 | SO₂CF₃ | 3 | 0.2 | 1 | 1 | 96 | 83 | 81 |
| Comparative Example 2 | — | — | — | — | — | — | — | — | 1 | 90 | 80 | 30 |

*Molar ratio A expresses a ratio of $[PF_aQ_bR_c + N(C_nF_{2n+1}SO_2)_2]^-$ to $PF_6^-$.
*Molar ratio B expresses a ratio of $N(C_nF_{2n+1}SO_2)_2^-$ to $(PF_aQ_bR_c)^-$.

$N(C_2F_5SO_2)_2^-$ was added to set the molar ratio B in the range of 0.1 to 0.5. As shown in Table 7, the capacity recovery rate after storage reached 96% at the maximum. The heavy load discharge maintenance rate was a maximum value of 87% at the molar ratio A of 2. Furthermore, the capacity maintenance rate after 200 cycles in the 50° C. atmosphere reached 84% (Example 2-29) at the maximum.

Summarizing the results of Tables 6 and 7 has confirmed that the values of the capacity recovery rate after storage, heavy load discharge maintenance rate, and the capacity maintenance rate after 200 cycles in Examples 2-1 to 2-37 were higher and improved compared with Comparative Examples 2-38 to 2-60 are results of examining properties when using $(PF_3(SO_2CF_3)_3)^-$ for the anion expressed by Chemical formula 3, $N(CF_3SO_2)_2^-$ for the anion expressed by Chemical formula 4 (n=2), and various total molar ratios A thereof ranging from 0.1 to 100 as shown in Table 8. The molar ratio B of zero means that $N(CF_3SO_2)_2^-$ is not contained. As shown in Table 8, the capacity recovery rate after storage tended to increase from 91% to 96%, as the molar ratio A increased. Particularly, the capacity recovery rate after storage in the presence of $N(CF_3SO_2)_2^-$ was about 1 to 3% higher than that in the absence thereof, and reached 96% at the maximum. For example, the capacity recovery rate after storage of Example 2-38 was 91%, and that of Example 2-39, in which the molar ratio B was set to 0.5 by the addition of $N(CF_3SO_2)_2^-$, was 1% higher and reached 92%.

The heavy load discharge maintenance rate was a maximum value of 87% at the molar ratio A of around 2 and 5. Furthermore, the capacity maintenance rate after 200 cycles in the 50° C. atmosphere increased, as the molar ratio A increased, and particularly, because of the addition of $N(CF_3SO_2)_2^-$, reached 84% at the maximum.

TABLE 9

|  | Molar ratio A | a | Q | b | R | c | Molar ratio B | n | concentration of the whole electrolyte salt mol/dm³ | capacity recovery rate after storage % | heavy load discharge maintenance rate % | capacity maintenance rate after 200 cycles (50° C.) |
|---|---|---|---|---|---|---|---|---|---|---|---|---|
| Example 2-61 | 0.1 | 3 | — | 0 | SO₂CF₃ | 3 | 0.5 | 2 | 1 | 92 | 80 | 58 |
| Example 2-62 | 0.3 | 3 | — | 0 | SO₂CF₃ | 3 | 0.5 | 2 | 1 | 94 | 82 | 75 |
| Example 2-63 | 0.5 | 3 | — | 0 | SO₂CF₃ | 3 | 0.2 | 2 | 1 | 95 | 83 | 69 |
| Example 2-64 | 0.5 | 3 | — | 0 | SO₂CF₃ | 3 | 0.4 | 2 | 1 | 95 | 84 | 75 |
| Example 2-65 | 1 | 3 | — | 0 | SO₂CF₃ | 3 | 0.2 | 2 | 1 | 96 | 85 | 78 |
| Example 2-66 | 1 | 3 | — | 0 | SO₂CF₃ | 3 | 0.4 | 2 | 1 | 96 | 85 | 83 |
| Example 2-67 | 2 | 3 | — | 0 | SO₂CF₃ | 3 | 0.2 | 2 | 1 | 95 | 86 | 78 |
| Example 2-68 | 5 | 3 | — | 0 | SO₂CF₃ | 3 | 0.2 | 2 | 1 | 96 | 87 | 79 |
| Example 2-69 | 10 | 3 | — | 0 | SO₂CF₃ | 3 | 0.1 | 2 | 1 | 95 | 82 | 70 |
| Example 2-70 | 10 | 3 | — | 0 | SO₂CF₃ | 3 | 0.2 | 2 | 1 | 96 | 82 | 78 |
| Example 2-71 | 50 | 3 | — | 0 | SO₂CF₃ | 3 | 0.1 | 2 | 1 | 96 | 82 | 67 |
| Example 2-72 | 50 | 3 | — | 0 | SO₂CF₃ | 3 | 0.2 | 2 | 1 | 96 | 82 | 76 |
| Example 2-73 | 100 | 3 | — | 0 | SO₂CF₃ | 3 | 0.1 | 2 | 1 | 95 | 82 | 65 |
| Example 2-74 | 100 | 3 | — | 0 | SO₂CF₃ | 3 | 0.2 | 2 | 1 | 95 | 81 | 74 |
| Comparative Example 2 | — | — | — | — | — | — | — | — | 1 | 90 | 80 | 30 |

*Molar ratio A expresses a ratio of $[PF_aQ_bR_c + N(C_nF_{2n+1}SO_2)_2]^-$ to $PF_6^-$.
*Molar ratio B expresses a ratio of $N(C_nF_{2n+1}SO_2)_2^-$ to $(PF_aQ_bR_c)^-$.

Examples 2-61 to 2-74 are results of examining properties when using $(PF_3(SO_2CF_3)_3)^-$ for the anion expressed by Chemical formula 3, $N(C_2F_5SO_2)_2^-$ for the anion expressed by Chemical formula 4 (n=2), and various total molar ratios A thereof ranging from 0.1 to 100. Here, $N(C_2F_5SO_2)_2^-$ was added to set the molar ratio B in the range of 0.1 to 0.5. As shown in Table 9, the capacity recovery rate after storage reached 96% at the maximum. The heavy load discharge maintenance rate was a maximum value of 87% at the molar ratio A of 2. Furthermore, the capacity maintenance rate after 200 cycles in the 50° C. atmosphere reached 83% (Example 2-66) at the maximum.

Summarizing the results of Tables 6 to 9 has confirmed that the values of the capacity recovery rate after storage, heavy load discharge maintenance rate, and the capacity maintenance rate after 200 cycles in Examples 2-1 to 2-74 were higher and improved compared with Comparative Example 2, because the anions expressed by $(PF_3(SO_2CF_3)_3)^-$ and $N(C_nF_{2n+1}SO_2)_2^-$ were dissolved in the electrolyte as the electrolyte salt.

Examples 3-1 to 3-8

Except for changing composition of the separator 23 and the electrolyte salt, the same cylinder type secondary batteries as the secondary battery shown in FIGS. 1 and 2 were produced like Examples 1-1 to 1-63.

TABLE 10

|  | separator | Molar ratio A | a | Q | b | R | c | Molar ratio B | n | concentration of the whole electrolyte salt mol/dm³ | capacity recovery rate after storage % | heavy load discharge maintenance rate % | capacity maintenance rate after 200 cycles (50° C.) | maximum temperature at overcharging |
|---|---|---|---|---|---|---|---|---|---|---|---|---|---|---|
| Example 3-1 | A | 2 | 3 | C₂F₅ | 3 | — | 0 | 0 | 1 | 1 | 71 | 74 | 45 | 83 |
| Example 3-2 | A | 2 | 3 | C₂F₅ | 3 | — | 0 | 0.2 | 1 | 1 | 72 | 74 | 63 | 82 |
| Example 3-3 | B | 2 | 3 | C₂F₅ | 3 | — | 0 | 0.2 | 1 | 1 | 85 | 80 | 76 | 82 |
| Example 3-4 | B | 2 | 3 | C₂F₅ | 3 | — | 0 | 0.2 | 1 | 1 | 84 | 81 | 75 | 83 |
| Example 3-5 | C | 2 | 3 | C₂F₅ | 3 | — | 0 | 0.2 | 1 | 1 | 82 | 80 | 73 | 81 |
| Example 3-6 | D | 2 | 3 | C₂F₅ | 3 | — | 0 | 0.2 | 1 | 1 | 83 | 80 | 74 | 83 |
| Example 3-7 | E | 2 | 3 | C₂F₅ | 3 | — | 0 | 0.2 | 1 | 1 | 85 | 82 | 76 | 82 |
| Example 3-8 | F | 2 | 3 | C₂F₅ | 3 | — | 0 | 0.2 | 1 | 1 | 84 | 81 | 74 | 81 |

TABLE 10-continued

|  | separator | Molar ratio A | a | Q | b | R | c | Molar ratio B | n | concentration of the whole electrolyte salt mol/dm$^3$ | capacity recovery rate after storage % | heavy load discharge maintenance rate % | capacity maintenance rate after 200 cycles (50° C.) | maximum temperature at over-charging |
|---|---|---|---|---|---|---|---|---|---|---|---|---|---|---|
| Comparative Example 3 | A | — | — | — | — | — | — | — | — | 1 | 60 | 65 | 15 | 80 |

*Molar ratio A expresses a ratio of [PF$_a$Q$_b$R$_c$ + N(C$_n$F$_{2n+1}$SO$_2$)$_2$]$^-$ to PF$_6^-$.
*Molar ratio B expresses a ratio of N(C$_n$F$_{2n+1}$SO$_2$)$_2^-$ to (PF$_a$Q$_b$R$_c$)$^-$.

Lithium salt obtained by mixing PF$_6^-$, (PF$_a$Q$_b$R$_c$)$^-$ expressed by Chemical formula 3, and N(C$_n$F$_{2n+1}$SO$_2$)$_2^-$ expressed by Chemical formula 4 at certain concentration ratio as showed in Table 10 was used as the electrolyte. Concentration of the whole electrolyte salt is similarly 1 mol/dm$^3$.

In Table 10, a molar ratio A expresses a total molar ratio of (PF$_a$Q$_b$R$_c$)$^-$ and N(C$_n$F$_{2n+1}$SO$_2$)$_2^-$ to PF$_6^-$. A molar ratio B expresses a molar ratio of N(C$_n$F$_{2n+1}$SO$_2$)$_2^-$ to (PF$_a$Q$_b$R$_c$)$^-$.

Using the secondary batteries produced as described above, battery capacities before storage were measured after discharging to a final voltage of 2.5 V at a constant current of 1.0 A. Then, constant current and voltage charging was performed again on the conditions of a maximum voltage of 4.2 V and a constant current of 1.0 A and a charge time of 5 h, and the batteries were stored for 14 days at 70° C. in the charged state. Then, the stored batteries were left at room temperature, and were discharged to a final voltage of 2.5 V at a constant current of 1.0 A. Then, one cycle of charge and discharge was performed on the above conditions, and recovered capacities after storage were measured. Moreover, the batteries were charged again and discharged at a constant current of 3.0 A, and heavy load capacities thereof were measured. Using the measured values which were obtained as described above, "capacity recovery rate after storage" was calculated by dividing the recovered capacity after storage by the battery capacity before storage, and "heavy load discharge maintenance rate" was calculated by dividing the heavy load capacity by the recovered capacity after storage.

Furthermore, using the above secondary batteries, battery capacities before cycle were measured by discharging the batteries to a final voltage of 2.5 V at a constant current of 1.0 A in a 70° C. atmosphere. Then, cycle of constant current and voltage charging in the 70° C. atmosphere on the conditions of a maximum voltage of 4.2 V, a constant current of 1.0 A and charge time of 5 h, and then discharging to a final voltage of 2.5 V at a constant current of 1.0 A in the 70° C. atmosphere was repeated, and battery capacities after 200 cycles were measured. "Capacity maintenance rate after 200 cycles" was calculated by dividing the obtained battery capacity after 200 cycles by the battery capacity before cycle.

Furthermore, overcharge safety was evaluated as follows. In the above secondary batteries, a thermocouple was stuck on a battery surface and constant current and voltage charging was performed in a 23° C. atmosphere on the conditions of a upper limit voltage of 18 V and an electric current of 1.5 A and charge time of 4 h, and a maximum temperature was measured. Those results are shown in Table 10.

Moreover, the batteries after storage at 70° C. and after 200 cycles in the 70° C. atmosphere were disassembled, and color of each of the separator 23 was confirmed by visual observation.

Hereinafter, with reference to Table 10, Examples 3-1 to 3-8 will be described in detail. In addition, Comparative Example 3, which is a secondary battery in which an electrolyte contain neither anions expressed by Chemical formulas 3 nor 4, is also shown in Table 10. Comparative Example 3 is the same as that of Examples 3-1 to 3-8 except for using LiPF$_6$ with a concentration of 1 mol/dm$^3$ as the electrolyte salt and a polyethylene micro porous film for the separator 23.

Examples 3-1 and 3-2 are examples when using a micro porous polyethylene film (which is described as "A" in Table 10) with a thickness of about 25 μm for the separator 23. As shown in Table 1, the capacity recovery rate after storage was increased from 60% to 71% because of the addition of (PF$_3$(C$_2$F$_5$)$_3$)$^-$, and the capacity recovery rate after storage was 1% increased, and the capacity recovery rate after storage reached 72% at the maximum because of the addition of N(CF$_3$ SO$_2$)$_2^-$. The heavy load discharge maintenance rate was 9% higher and reached 74% because of the addition of (PF$_3$(C$_2$F$_5$)$_3$)$^-$. Furthermore, the capacity maintenance rate after 200 cycles in the 70° C. atmosphere was increased from 15% to 45% because of the addition of (PF$_3$(C$_2$F$_5$)$_3$)$^-$, and the capacity maintenance rate was more increased and reached 63% because of the addition of N(CF$_3$SO$_2$)$_2^-$. Furthermore, the maximum temperature at the overcharging was almost the same as that of Comparative Example 3, there was no explosion nor ignite in any Examples, and the safety has been confirmed.

Moreover, the separator 23 after the storage at 70° C. and after the 200 cycles in the 70° C. atmosphere was discolored and was black slightly, although it was white immediately after battery production. On the other hand, in Comparative Example 3, the white, which was the color immediately after the production, was changed into black. That is, it is thought that deterioration of the separator occurred in Comparative Example 3, but the deterioration was prevented in Examples 3-1 and 3-2.

Examples 3-3 and 3-4 are examples of secondary batteries using the separator 23 having a two-layer structure of a polyethylene micro porous film with a thickness of about 13 μm and a polypropylene micro porous film with a thickness of about 12 μm (which is described as "B" in Table 10). The polyethylene micro porous film side thereof was contacted to the positive electrode in Example 3-3, and the polyethylene micro porous film side thereof was contacted to the negative electrode in Example 3-4.

Example 3-5 is an example of a secondary battery using the separator 23 made of a micro porous film with a thickness of about 25 μm which is produced by copolymerization of 50 weight % of polyethylene and 50 weight % of polypropylene (which is described as "C" in Table 10).

Example 3-6 is an example of a secondary battery using the separator 23 made of a micro porous film with a thickness of about 25 μm which is made of a mixture of 50 weight % of polyethylene and 50 weight % of polypropylene (which is described as "D" in Table 10).

Example 3-7 is an example of a secondary battery using the separator 23 having a three-layer structure in which a polypropylene micro porous film with a thickness of about 5 μm, a polyethylene micro porous film with a thickness of about 15 μm, and a polypropylene micro porous film with a thickness of about 5 μm are laminated in order (which is described as "E" in Table 10).

Example 3-8 is an example of a secondary battery using the separator 23 made of a micro porous film with a thickness of about 25 μm which is made of a mixture of 50 weight % of polyethylene and 50 weight % of an aromatic polyamide (which is described as "F" in Table 10).

As shown in Table 10, all of the capacity recovery rate after storage, heavy load discharge maintenance rate, and the capacity maintenance rate after 200 cycles in the 70° C. atmosphere were increased in any of Examples 3-3 to 3-8, compared with Example 3-2. In these cases, there was no significant difference among the characteristic values of Examples 3-3 to 3-8, and utilization of any composition for the separator 23 provided almost the same effects. Furthermore, there was almost no difference among the maximum temperatures at the overcharging, there was no explosion nor ignite in any Examples, and the safety has been confirmed.

Moreover, in all of Examples 3-4 to 3-8, the color of the separator 23 after the storage at 70° C. and after the 200 cycles in the 70° C. atmosphere was almost changeless compared with white which was the color immediately after the production. That is, it is thought that the deterioration of the separator 23 was prevented further.

These results have revealed that containing the anion expressed by Chemical formula 3 in the electrolyte can prevent degradation of the electrolyte, and provide the secondary battery which has high capacity recovery rate after storage at high temperatures, and is excellent also in the heavy load characteristics after storage.

Particularly, it is revealed that containing the anion expressed by Chemical formula 4 in the electrolyte provides the secondary battery which has higher capacity recovery rate after storage at high temperatures, and is more excellent also in the heavy load characteristics after storage.

Furthermore, the separator 23 made of the micro porous film having the two-layer structure of polyethylene and polypropylene, the micro porous film made of the copolymer of polyethylene and polypropylene, the micro porous film made of the mixture of polyethylene and polypropylene, the micro porous film having the three-layer structure of polypropylene, polyethylene and polypropylene, or the micro porous film having polyethylene and aromatic polyamide, can prevent the degradation of the electrolyte and the deterioration of the separator 23, and provide the secondary battery which has higher capacity recovery rate after storage at high temperatures, and is more excellent also in the heavy load characteristics after storage and the charge and discharge cycle characteristics in high temperature atmospheres.

Although the invention has been described by the foregoing embodiment and Examples, the invention is not limited to the embodiment and Examples but can be variously modified. For example, the secondary batteries using the liquid electrolyte where the electrolyte salt is dissolved into the nonaqueous solvent have been described in the above embodiment and Examples, but not necessarily limited to these, other electrolytes such as a gel-type electrolyte containing lithium-salt dissolved nonaqueous solvent hold by a high molecular compound, and an electrolyte containing lithium salt hold by an inorganic solid conductor may be used.

Moreover, the cylinder type secondary battery with the spiral structure has been described referring to the concrete examples in the above embodiment and Examples, and cylinder type secondary batteries with other structure are also applicable to the present invention. Furthermore, secondary batteries with other shapes such as a coin type, a button type, or a square type except for the cylinder type, are applicable similarly.

As described above, according to the secondary battery of the invention, the anion expressed by Chemical formula 3 is contained in the electrolyte, which can prevents degradation of the electrolyte. Therefore, the secondary battery exhibits the high capacity recovery rate after storage and heavy load discharge maintenance rate even in high temperature atmospheres, which provides the high reliability to the battery. This ensures the sufficient drive time even to electric devices which require high power and generate heat accompanying operations.

Particularly, according to the secondary battery of one aspect of the invention, the anion expressed by Chemical formula 4 is contained, so the degradation of the electrolyte can be prevented further and the capacity maintenance rate after 200 cycles is increased. Therefore, much longer drive time is securable even in electric devices which require high power and generate heat accompanying operations.

Moreover, according to the secondary battery of another aspect of the invention, using the separator made of the micro porous film having the two-layer structure of polyethylene and polypropylene, the micro porous film made of the copolymer of polyethylene and polypropylene, the micro porous film made of the mixture of polyethylene and polypropylene, the micro porous film having the three-layer structure of polypropylene, polyethylene and polypropylene, or the micro porous film having polyethylene and aromatic polyamide, can prevent the degradation of the electrolyte and the deterioration of the separator. Therefore, this provides higher capacity recovery rate characteristics after storage at high temperatures, more excellent heavy load characteristics after storage, and more excellent charge and discharge cycle characteristics in high temperature atmospheres.

Moreover, according to the secondary battery of still another aspect of the invention, the negative electrode contains at least one selected from the groups consisting of lithium, the carbon material which can insert and extract lithium, and the elementary substances, the alloys, and the compounds of the metallic elements and the metalloid elements which can form an alloy with lithium, which provides higher capacities.

According to the electrolyte of the invention, the anion expressed by Chemical formulas 3 and 4 is contained, which can prevent degradation of the solvent of the electrolytic solution or the electrolyte. Therefore, the secondary battery formed using the electrolyte exhibits the high capacity recovery rate after storage and heavy load discharge maintenance rate even in high temperature atmospheres, and has excellent high temperature cycle characteristics.

What is claimed is:
1. A secondary battery comprising a positive electrode, a negative electrode and an electrolyte, wherein the electrolyte comprises a first anion expressed by Chemical formula 5 and a second anion expressed by Chemical formula 6, wherein Chemical formula 5 is $PF_aQ_bR_c^-$ and Q expresses at least one compound selected from the group consisting of $CF_3$, $C_2F_5$, and $C_3F_7$, R expresses $SO_2CF_3$ or $SO_2C_2F_5$, and a, b and c satisfy $1 \leq a \leq 5$, $0 \leq b \leq 5$ and $0 \leq c \leq 5$, and a+b+c=6; and a, b, c is an integer, wherein Chemical formula 6 is $N(C_nF_{2n+1}SO_2)_2^-$ and n satisfies $1 \leq n \leq 2$.

2. A secondary battery according to claim 1, further comprising a separator located between the positive electrode and the negative electrode, wherein the separator is made of a micro porous film having a two-layer structure of polyethylene and polypropylene.

3. A secondary battery according to claim 1, further comprising a separator located between the positive electrode and the negative electrode, wherein the separator is made of a micro porous film having a two-layer structure of polyethylene and polypropylene.

4. A secondary battery according to claim 1, further comprising a separator located between the positive electrode and the negative electrode, wherein the separator is made of a micro porous film made of a mixture of polyethylene and polypropylene.

5. A secondary battery according to claim 1, further comprising a separator located between the positive electrode and the negative electrode, wherein the separator is made of a micro porous film having a three-layer structure of polypropylene, polyethylene and polypropylene.

6. A secondary battery according to claim 1, further comprising a separator located between the positive electrode and the negative electrode, wherein the separator is made of a micro porous film having polyethylene and an aromatic polyamide.

7. A secondary battery according to claim 1, wherein the negative electrode contains graphite.

8. A secondary battery according to claim 1, wherein the positive electrode contains a metal oxide compound expressed by the following Chemical formula 7: $Li_sM_tO_u$ (wherein M expresses at least one element selected from the group consisting of cobalt, nickel, manganese, iron, aluminum, vanadium, titanium, and magnesium, s and t are not less than one, and u is not less than two).

9. A secondary battery according to claim 1, wherein the electrolyte contains lithium hexafluorophsophate (LiPF6).

10. An electrolyte comprising a third anion expressed by Chemical formula 8 and a fourth anion expressed by Chemical formula 9, wherein Chemical formula 8 is $PF_aQ_bR_c^-$, and, Q expresses at least one compound selected from the group consisting of $CF_3$, $C_2F_5$, and $C_3F_7$;

R expresses $SO_2CF_3$ or $SO_2C_2F_5$; and a, b and c satisfy $1 \leq a \leq 5$, $0 \leq b \leq 5$ and $0 \leq c \leq 5$, and a+b+c=6; and a, b, c, is an integer wherein Chemical formula 9 is $N(C_nF_{2n+1}SO_2)_2^-$ and n satisfies $1 \leq n \leq 2$.

11. An electrolyte according to claim 10, wherein the electrolyte contains lithium hexafluorophosphate (LiPF6).

12. A secondary battery according to claim 1, wherein the negative electrode comprises a negative active material comprising a first material selected from the group of alkali metals, alkali earth metals, carbon materials wherein the carbon material insert and extract lithium, elementary substances, alloys, compounds of metallic elements and metalloid elements.

13. A secondary battery according to claim 12, wherein the negative active material further comprises an alloy wherein the alloy is a silver (Ag), aluminum (Al), arsenic (As), boron (B), bismuth (Bi), cadmium (Cd), gallium (Ga), germanium (Ge), hafnium (Hf), lead (Pb), tin (Sn), silicon (Si), yttirum (Y), zinc (Zn).

14. A secondary battery according to claim 13, wherein the negative active material further comprises a second material selected from the group of metallic elements and metalloid elements.

* * * * *